(12) United States Patent  
Takahashi et al.

(10) Patent No.: US 8,723,933 B2  
(45) Date of Patent: *May 13, 2014

(54) THREE-DIMENSIONAL IMAGE CORRECTION DEVICE, THREE-DIMENSIONAL IMAGE CORRECTION METHOD, THREE-DIMENSIONAL IMAGE DISPLAY DEVICE, THREE-DIMENSIONAL IMAGE REPRODUCTION DEVICE, THREE-DIMENSIONAL IMAGE PROVISION SYSTEM, PROGRAM, AND RECORDING MEDIUM

(75) Inventors: Shuichi Takahashi, Kanagawa (JP); Isao Ohashi, Kanagawa (JP); Takuya Ooi, Tokyo (JP); Kazunari Yoshifuji, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,650

(22) Filed: Sep. 5, 2012

(65) Prior Publication Data

US 2012/0327200 A1 Dec. 27, 2012

Related U.S. Application Data

(63) Continuation of application No. 12/537,298, filed on Aug. 7, 2009, now Pat. No. 8,289,379.

(30) Foreign Application Priority Data

Aug. 12, 2008 (JP) ................................. 2008-207998

(51) Int. Cl.  
*H04N 13/04* (2006.01)

(52) U.S. Cl.  
USPC .................... 348/51; 348/53; 348/54; 348/57

(58) Field of Classification Search  
None  
See application file for complete search history.

(56) References Cited

U.S. PATENT DOCUMENTS

| 7,809,159 | B2 * | 10/2010 | Ishiyama | 382/103 |
| 2005/0047552 | A1 * | 3/2005 | Arai et al. | 378/207 |
| 2006/0222238 | A1 * | 10/2006 | Nishiyama | 382/154 |
| 2009/0310935 | A1 * | 12/2009 | Era | 386/69 |
| 2012/0105611 | A1 * | 5/2012 | Godar | 348/54 |
| 2013/0162641 | A1 * | 6/2013 | Zhang et al. | 345/419 |

FOREIGN PATENT DOCUMENTS

| JP | 09-121370 | 5/1997 |
| JP | 2004-180069 | 6/2004 |
| JP | 2005-073049 | 3/2005 |
| JP | 3749227 | 12/2005 |
| JP | 2006-333400 | 12/2006 |

* cited by examiner

*Primary Examiner* — Mohamed Ibrahim  
(74) *Attorney, Agent, or Firm* — Dentons US LLP

(57) ABSTRACT

A three-dimensional image correction device includes when a displacement amount which is a difference between a convergence angle on a display surface and a convergence angle on a perceived three-dimensional surface based on image information for a three-dimensional image is set as a disparity amount, a width of a depth amount represented by pop-up and pull-in of the three-dimensional image is set as a dynamic range, and display device specification information is set as display device information, a disparity amount detection unit for inputting the image information to detect the disparity amount from the image information, a correction computation unit for adjusting the detected disparity amount on the basis of the display device information to correct the dynamic range, and a disparity amount correction unit for correcting the disparity amount in the corrected dynamic range while corresponding to the display device information.

12 Claims, 21 Drawing Sheets

FIG. 17

| DISPLAY SIZE | | | BINOCULAR DISPARITY AMOUNT (−30% ⋯ +30%): D | | | | | |
|---|---|---|---|---|---|---|---|---|
| SIZE (INCH) | W (m) | H (m) | −30.0% | −29.5% | −29.0% | −28.5% | −28.0% | −27.5% |
| 700 | 15.50 | 8.72 | −0.37 | −0.38 | −0.38 | −0.39 | −0.40 | −0.41 |
| 100 | 2.21 | 1.25 | −0.41 | −0.41 | −0.42 | −0.43 | −0.44 | −0.45 |
| 70 | 1.55 | 0.87 | −0.43 | −0.43 | −0.44 | −0.45 | −0.46 | −0.47 |
| 40 | 0.89 | 0.50 | −0.48 | −0.49 | −0.51 | −0.52 | −0.53 | −0.54 |
| 32 | 0.71 | 0.40 | −0.53 | −0.54 | −0.55 | −0.57 | −0.58 | −0.60 |
| 20 | 0.41 | 0.30 | −1.14 | −1.18 | −1.23 | −1.28 | −1.33 | −1.39 |
| 11 | 0.22 | 0.17 | −31.61 | −69.27 | 362.72 | 50.12 | 26.92 | 18.40 |

| −27.0% | −26.5% | −26.0% | −25.5% | −25.0% | −24.5% | −24.0% | −23.5% | −23.0% | −22.5% |
|---|---|---|---|---|---|---|---|---|---|
| −0.41 | −0.42 | −0.43 | −0.44 | −0.45 | −0.46 | −0.47 | −0.48 | −0.49 | −0.50 |
| −0.46 | −0.47 | −0.48 | −0.49 | −0.50 | −0.51 | −0.52 | −0.53 | −0.55 | −0.56 |
| −0.48 | −0.49 | −0.50 | −0.51 | −0.53 | −0.54 | −0.55 | −0.57 | −0.58 | −0.60 |
| −0.56 | −0.57 | −0.59 | −0.60 | −0.62 | −0.64 | −0.66 | −0.68 | −0.70 | −0.72 |
| −0.62 | −0.63 | −0.65 | −0.67 | −0.69 | −0.72 | −0.74 | −0.77 | −0.79 | −0.82 |
| −1.45 | −1.52 | −1.60 | −1.68 | −1.78 | −1.88 | −2.00 | −2.13 | −2.28 | −2.46 |
| 13.98 | 11.27 | 9.44 | 8.12 | 7.13 | 6.35 | 5.72 | 5.21 | 4.78 | 4.42 |

| −22.0% | −21.5% | −21.0% | −20.5% | −20.0% | −19.5% | −19.0% | −18.5% | −18.0% | −17.5% |
|---|---|---|---|---|---|---|---|---|---|
| −0.51 | −0.52 | −0.53 | −0.55 | −0.56 | −0.57 | −0.59 | −0.61 | −0.62 | −0.64 |
| −0.58 | −0.59 | −0.61 | −0.62 | −0.64 | −0.66 | −0.68 | −0.70 | −0.73 | −0.75 |
| −0.62 | −0.63 | −0.65 | −0.67 | −0.69 | −0.72 | −0.74 | −0.77 | −0.79 | −0.82 |
| −0.75 | −0.77 | −0.80 | −0.83 | −0.87 | −0.90 | −0.94 | −0.98 | −1.03 | −1.08 |
| −0.88 | −0.89 | −0.93 | −0.97 | −1.01 | −1.06 | −1.12 | −1.18 | −1.24 | −1.32 |
| −2.66 | −2.90 | −3.20 | −3.55 | −3.99 | −4.56 | −5.32 | −6.38 | −7.97 | −10.62 |
| 4.11 | 3.84 | 3.60 | 3.39 | 3.20 | 3.04 | 2.88 | 2.75 | 2.62 | 2.51 |

| −17.0% | −16.5% | −16.0% | −15.5% | −15.0% | −14.5% | −14.0% | −13.5% | −13.0% | −12.5% |
|---|---|---|---|---|---|---|---|---|---|
| −0.66 | −0.68 | −0.70 | −0.73 | −0.75 | −0.78 | −0.81 | −0.84 | −0.87 | −0.91 |
| −0.78 | −0.81 | −0.84 | −0.87 | −0.91 | −0.95 | −0.99 | −1.04 | −1.09 | −1.15 |
| −0.86 | −0.89 | −0.93 | −0.97 | −1.02 | −1.06 | −1.12 | −1.18 | −1.25 | −1.32 |
| −1.14 | −1.20 | −1.27 | −1.34 | −1.43 | −1.53 | −1.65 | −1.78 | −1.94 | −2.13 |
| −1.40 | −1.50 | −1.61 | −1.73 | −1.88 | −2.06 | −2.27 | −2.54 | −2.87 | −3.30 |
| −15.90 | −31.61 | −2708.33 | 32.37 | 16.09 | 10.70 | 8.02 | 6.41 | 5.34 | 4.58 |
| 2.41 | 2.31 | 2.22 | 2.14 | 2.07 | 1.99 | 1.93 | 1.87 | 1.81 | 1.75 |

FIG. 18

| SIZE (INCH) | -12.0% | -11.5% | -11.0% | -10.5% | -10.0% | -9.5% | -9.0% | -8.5% | -8.0% |
|---|---|---|---|---|---|---|---|---|---|
| 700 | -0.95 | -0.99 | -1.04 | -1.09 | -1.14 | -1.21 | -1.28 | -1.36 | -1.45 |
| 100 | -1.21 | -1.28 | -1.36 | -1.45 | -1.55 | -1.67 | -1.81 | -1.97 | -2.17 |
| 70 | -1.41 | -1.50 | -1.61 | -1.74 | -1.89 | -2.07 | -2.28 | -2.55 | -2.88 |
| 40 | -2.35 | -2.64 | -3.00 | -3.47 | -4.12 | -5.08 | -6.61 | -9.46 | -16.63 |
| 32 | -3.88 | -4.72 | -6.01 | -8.28 | -13.30 | -33.79 | 62.54 | 16.24 | 9.33 |
| 20 | 4.00 | 3.56 | 3.20 | 2.91 | 2.67 | 2.46 | 2.29 | 2.13 | 2.00 |
| 11 | 1.70 | 1.65 | 1.61 | 1.57 | 1.52 | 1.49 | 1.45 | 1.41 | 1.38 |

| -7.5% | -7.0% | -6.5% | -6.0% | -5.5% | -5.0% | -4.5% | -4.0% | -3.5% | -3.0% |
|---|---|---|---|---|---|---|---|---|---|
| -1.55 | -1.67 | -1.80 | -1.97 | -2.16 | -2.39 | -2.69 | -3.06 | -3.56 | -4.25 |
| -2.40 | -2.70 | -3.08 | -3.58 | -4.28 | -5.31 | -7.01 | -10.31 | -19.45 | -171.72 |
| -3.32 | -3.91 | -4.76 | -6.08 | -8.40 | -13.62 | -35.90 | 56.40 | 15.79 | 9.18 |
| -68.69 | 32.23 | 13.05 | 8.18 | 5.96 | 4.96 | 3.86 | 3.28 | 2.86 | 2.53 |
| 6.55 | 5.04 | 4.10 | 3.45 | 2.98 | 2.63 | 2.35 | 2.12 | 1.93 | 1.78 |
| 1.88 | 1.78 | 1.68 | 1.60 | 1.52 | 1.45 | 1.39 | 1.33 | 1.28 | 1.23 |
| 1.35 | 1.32 | 1.29 | 1.26 | 1.23 | 1.21 | 1.18 | 1.16 | 1.14 | 1.12 |

| -2.5% | -2.0% | -1.5% | -1.0% | -0.5% | 0.0% | 0.5% | 1.0% | 1.5% | 2.0% |
|---|---|---|---|---|---|---|---|---|---|
| -5.27 | -6.94 | -10.15 | -18.89 | -136.17 | 26.15 | 11.93 | 7.73 | 5.71 | 4.53 |
| 25.15 | 11.72 | 7.64 | 5.67 | 4.50 | 3.74 | 3.19 | 2.79 | 2.47 | 2.22 |
| 6.47 | 5.00 | 4.07 | 3.43 | 2.97 | 2.62 | 2.34 | 2.11 | 1.93 | 1.77 |
| 2.27 | 2.05 | 1.88 | 1.73 | 1.60 | 1.49 | 1.40 | 1.32 | 1.24 | 1.17 |
| 1.64 | 1.53 | 1.43 | 1.34 | 1.26 | 1.20 | 1.13 | 1.08 | 1.03 | 0.98 |
| 1.19 | 1.14 | 1.10 | 1.07 | 1.03 | 1.00 | 0.97 | 0.94 | 0.91 | 0.89 |
| 1.09 | 1.07 | 1.05 | 1.04 | 1.02 | 1.00 | 0.98 | 0.97 | 0.95 | 0.94 |

| 2.5% | 3.0% | 3.5% | 4.0% | 4.5% | 5.0% | 5.5% | 6.0% | 6.5% | 7.0% |
|---|---|---|---|---|---|---|---|---|---|
| 3.76 | 3.21 | 2.80 | 2.48 | 2.23 | 2.02 | 1.85 | 1.71 | 1.59 | 1.48 |
| 2.02 | 1.85 | 1.70 | 1.58 | 1.48 | 1.38 | 1.30 | 1.23 | 1.16 | 1.10 |
| 1.64 | 1.52 | 1.43 | 1.34 | 1.26 | 1.19 | 1.13 | 1.08 | 1.03 | 0.98 |
| 1.11 | 1.06 | 1.01 | 0.97 | 0.93 | 0.89 | 0.85 | 0.82 | 0.79 | 0.76 |
| 0.94 | 0.90 | 0.87 | 0.83 | 0.80 | 0.77 | 0.75 | 0.72 | 0.70 | 0.68 |
| 0.86 | 0.84 | 0.82 | 0.80 | 0.78 | 0.76 | 0.74 | 0.73 | 0.71 | 0.70 |
| 0.92 | 0.91 | 0.89 | 0.88 | 0.87 | 0.85 | 0.84 | 0.83 | 0.82 | 0.81 |

FIG. 19

| SIZE (INCH) | 7.5% | 8.0% | 8.5% | 9.0% | 9.5% | 10.0% | 10.5% | 11.0% | 11.5% |
|---|---|---|---|---|---|---|---|---|---|
| 700 | 1.39 | 1.30 | 1.23 | 1.16 | 1.11 | 1.05 | 1.00 | 0.96 | 0.92 |
| 100 | 1.05 | 1.00 | 0.96 | 0.92 | 0.88 | 0.85 | 0.82 | 0.79 | 0.76 |
| 70 | 0.94 | 0.90 | 0.86 | 0.83 | 0.80 | 0.77 | 0.75 | 0.72 | 0.70 |
| 40 | 0.74 | 0.72 | 0.69 | 0.67 | 0.65 | 0.63 | 0.61 | 0.60 | 0.58 |
| 32 | 0.66 | 0.64 | 0.62 | 0.60 | 0.59 | 0.57 | 0.56 | 0.54 | 0.53 |
| 20 | 0.68 | 0.67 | 0.65 | 0.64 | 0.63 | 0.62 | 0.60 | 0.59 | 0.58 |
| 11 | 0.79 | 0.78 | 0.77 | 0.76 | 0.75 | 0.74 | 0.73 | 0.73 | 0.72 |

| 12.0% | 12.5% | 13.0% | 13.5% | 14.0% | 14.5% | 15.0% | 15.5% | 16.0% | 16.5% |
|---|---|---|---|---|---|---|---|---|---|
| 0.88 | 0.85 | 0.82 | 0.79 | 0.76 | 0.74 | 0.71 | 0.69 | 0.67 | 0.65 |
| 0.73 | 0.71 | 0.69 | 0.67 | 0.65 | 0.63 | 0.61 | 0.59 | 0.58 | 0.56 |
| 0.68 | 0.66 | 0.64 | 0.62 | 0.60 | 0.59 | 0.57 | 0.56 | 0.54 | 0.53 |
| 0.57 | 0.55 | 0.54 | 0.53 | 0.51 | 0.50 | 0.49 | 0.48 | 0.47 | 0.46 |
| 0.52 | 0.51 | 0.49 | 0.48 | 0.47 | 0.46 | 0.45 | 0.44 | 0.44 | 0.43 |
| 0.57 | 0.56 | 0.55 | 0.54 | 0.53 | 0.52 | 0.52 | 0.51 | 0.50 | 0.49 |
| 0.71 | 0.70 | 0.69 | 0.68 | 0.68 | 0.67 | 0.66 | 0.65 | 0.65 | 0.64 |

| 17.0% | 17.5% | 18.0% | 18.5% | 19.0% | 19.5% | 20.0% | 20.5% | 21.0% | 21.5% |
|---|---|---|---|---|---|---|---|---|---|
| 0.63 | 0.61 | 0.60 | 0.58 | 0.56 | 0.55 | 0.54 | 0.52 | 0.51 | 0.50 |
| 0.55 | 0.54 | 0.52 | 0.51 | 0.50 | 0.49 | 0.48 | 0.47 | 0.46 | 0.45 |
| 0.52 | 0.51 | 0.49 | 0.48 | 0.47 | 0.46 | 0.45 | 0.44 | 0.44 | 0.43 |
| 0.45 | 0.44 | 0.43 | 0.42 | 0.42 | 0.41 | 0.40 | 0.39 | 0.39 | 0.38 |
| 0.42 | 0.41 | 0.40 | 0.40 | 0.39 | 0.38 | 0.38 | 0.37 | 0.36 | 0.36 |
| 0.48 | 0.48 | 0.47 | 0.46 | 0.46 | 0.45 | 0.44 | 0.44 | 0.43 | 0.43 |
| 0.63 | 0.62 | 0.62 | 0.61 | 0.60 | 0.60 | 0.59 | 0.59 | 0.58 | 0.57 |

| 22.0% | 22.5% | 23.0% | 23.5% | 24.0% | 24.5% | 25.0% | 25.5% | 26.0% | 26.5% |
|---|---|---|---|---|---|---|---|---|---|
| 0.49 | 0.48 | 0.47 | 0.46 | 0.45 | 0.44 | 0.43 | 0.42 | 0.42 | 0.41 |
| 0.44 | 0.43 | 0.42 | 0.41 | 0.41 | 0.40 | 0.39 | 0.39 | 0.38 | 0.37 |
| 0.42 | 0.41 | 0.40 | 0.40 | 0.39 | 0.38 | 0.38 | 0.37 | 0.36 | 0.36 |
| 0.37 | 0.37 | 0.36 | 0.36 | 0.35 | 0.34 | 0.34 | 0.33 | 0.33 | 0.32 |
| 0.35 | 0.35 | 0.34 | 0.34 | 0.33 | 0.33 | 0.32 | 0.32 | 0.31 | 0.31 |
| 0.42 | 0.42 | 0.41 | 0.40 | 0.40 | 0.39 | 0.39 | 0.39 | 0.38 | 0.38 |
| 0.57 | 0.56 | 0.56 | 0.55 | 0.55 | 0.54 | 0.54 | 0.53 | 0.53 | 0.52 |

FIG. 20

| SIZE (INCH) | 27.0% | 27.5% | 28.0% | 28.5% | 29.0% | 29.5% | 30.0% |
|---|---|---|---|---|---|---|---|
| 700 | 0.40 | 0.39 | 0.39 | 0.38 | 0.37 | 0.37 | 0.36 |
| 100 | 0.37 | 0.36 | 0.35 | 0.35 | 0.34 | 0.34 | 0.33 |
| 70 | 0.35 | 0.35 | 0.34 | 0.34 | 0.33 | 0.33 | 0.32 |
| 40 | 0.32 | 0.31 | 0.31 | 0.31 | 0.30 | 0.30 | 0.29 |
| 32 | 0.30 | 0.30 | 0.30 | 0.29 | 0.29 | 0.28 | 0.28 |
| 20 | 0.37 | 0.37 | 0.36 | 0.36 | 0.36 | 0.35 | 0.35 |
| 11 | 0.52 | 0.51 | 0.51 | 0.51 | 0.50 | 0.50 | 0.49 |

THREE-DIMENSIONAL IMAGE CORRECTION DEVICE, THREE-DIMENSIONAL IMAGE CORRECTION METHOD, THREE-DIMENSIONAL IMAGE DISPLAY DEVICE, THREE-DIMENSIONAL IMAGE REPRODUCTION DEVICE, THREE-DIMENSIONAL IMAGE PROVISION SYSTEM, PROGRAM, AND RECORDING MEDIUM

RELATED APPLICATION DATA

This application is a continuation of U.S. patent application Ser. No. 12/537,298, filed Aug. 7, 2009, the entirety of which is incorporated herein by reference to the extent permitted by law. The present application claims the benefit of priority to Japanese Patent Application No. JP 2008-207998 filed in the Japan Patent Office on Aug. 12, 2008, the entirety of which is incorporated by reference herein to the extent permitted by law.

BACKGROUND OF THE INVENTION

1. Field of the Invention

The present invention relates to a system configured to provide a three-dimensional image to a viewer having liquid crystal shutter glasses or the like mounted thereon, a three-dimensional image correction system applicable to a three-dimensional image display system having a function of correcting a pop-up amount, a pull-in amount, and the like of a three-dimensional image to be perceived by a viewer, a three-dimensional image correction method, a three-dimensional image display device, a three-dimensional image reproduction device, a three-dimensional image provision system, a program, and a recording medium. More specifically, the invention relates to a system provided with a correction computation unit configured to correct a dynamic range on the basis of a disparity amount detected from image information for a three-dimensional image composed of an image for a left eye and an image for a right eye and information on a screen size and the like of a display device configured to display a three-dimensional image, in which the disparity amount is corrected in the corrected dynamic range while corresponding to display device information so as to be able to adjust a pop-up amount, a pull-in amount, and the like of a target object while corresponding to the display device information, and also even in a case where a specification of the display device is varied, not only it is possible to realize the pop-up amount, the pull-in amount, and the like preferred by the viewer, but also it is possible to accurately express the pop-up amount, the pull-in amount, and the like intended by an image creator.

2. Description of the Related Art

In recent years, a slimmer television set has been realized with a higher definition and a larger screen. For the next paradigm shift (scientific revolution), researches are actively carried out in the field of three-dimensional display. In a three-dimensional display technology, a method of utilizing a binocular disparity to allow the viewer to perceive a three-dimensional object is generally used, and a large number of achievements have been reported.

For example, a three-dimensional image system is developed which is configured to provide a three-dimensional image to the viewer having the liquid crystal shutter glasses or the like mounted thereon. For a three-dimensional image display device in which the viewer has the liquid crystal shutter glasses mounted thereon and views the three-dimensional image, in order to present the three-dimensional image by utilizing the binocular disparity, a display method is adopted in which different images are arranged to enter into the left eye and the right eye.

According to such a display method, a disparity amount is set between the image for the left eye and the image for the right eye while targeting the same object. The disparity amount herein is a difference between a convergence angle on a display surface and a convergence angle on a three-dimensional surface to be perceived based on image information for a three-dimensional image and is, between a pixel displacement amount of a binocular disparity image on the display surface and a standard visual distance from the display surface to eyes of a viewer, substantially approximated by (the pixel displacement amount)/(the standard visual distance). By adjusting this disparity amount, it is possible to set a pop-up amount, a pull-in amount, and the like of the target image. For example, in a case where three-dimensional images are viewed in a cinema or the like, a screen size is fixed. Thus, the pop-up amount, the pull-in amount, and the like of the object which are intended by an image creator and also with which the viewers do not feel unpleasant sensation or sense of discomfort can be substantially uniquely decided.

In association with this type of the three-dimensional display technology, Japanese Patent No. 3749227 discloses a three-dimensional image processing method and device. This three-dimensional image processing device includes an instruction obtaining unit, a disparity identifying unit, and a disparity control unit. When a three-dimensional image is displayed on the basis of a plurality of viewpoint images corresponding to different disparities, the instruction obtaining unit obtains a response from a user whether or not the three-dimensional image displayed in various disparities is acceptable. On the basis of the obtained response, the disparity identifying unit identifies an appropriate disparity as the disparity acceptable by the user. On the premise of this, when another three-dimensional image different from the three-dimensional image is displayed, in order that the user can accept the other three-dimensional image, the disparity control unit applies a processing on the other three-dimensional image on the basis of the identified appropriate disparity. With the three-dimensional image processing device having the above-mentioned configuration, it is possible to generate or display the three-dimensional image and the like suitable to human physiology. Also, the three-dimensional sensitivity can be adjusted through a simple operation.

SUMMARY OF THE INVENTION

Incidentally, with the three-dimensional image processing device according to the related art example as disclosed in Japanese Patent No. 3749227, when the three-dimensional image is displayed, sample images having plurality of different disparities are presented, as the viewer responses as to whether these images can be accepted or not, the three-dimensional image is displayed at the disparity amount preferred by the user. Also, once, by holding the set information, even when a different image is input, resetting is not performed.

However, according to the related art technology, the pop-up amount, the pull-in amount, and the like preferred by the user can be set, but it is difficult to reproduce the pop-up amount and the pull-in amount intended by the image creator.

On the other hand, in a case where the same contents at the time of screen distribution is viewed with a television set in household, the screen size of the display device used by viewers often vary from a small type to a large type. In such a case, video pictures for three-dimensional images are displayed at different disparities depending on a screen size of a display device. That is, it is supposed that the pop-up amount, the pull-in amount, and the like of the target object to be perceived by the viewers are not uniquely decided. In a case where the pop-up amount is excessively large, the viewer feels unpleasant sensation or sense of discomfort. In contrast, the pop-up amount and the pull-in amount are excessively suppressed, the creative intention of the image creator is not reflected, and also the viewer does not enjoy the three-dimensional images.

FIG. 21 is a graph chart showing a quantitative relational example between a % binocular disparity amount D and the pop-up amount and the pull-in amount of the target object. The vertical axis shown in FIG. 21 is a distance [m] to the target object perceived by the viewer which is represented in the logarithmic scale. The horizontal axis is a % binocular disparity amount D of the binocular disparity image in which the relative amount with respect to the width of the displayable area of the image display device is regulated by way of percentile [%].

Lozenge marks on the solid line shown in FIG. 21 form a characteristic curve showing a quantitative relational example between the % binocular disparity amount D in a screen of 700 inches and the pop-up amount and the like of the target object. Cross marks on the solid line form a characteristic curve showing a quantitative relational example between the % binocular disparity amount D in an image display device of 40 inches and the pop-up amount and the like of the target object. Cross marks on the dashed-dotted line form a characteristic curve showing a quantitative relational example between the % binocular disparity amount D in an image display device of 11 inches and the pop-up amount and the like of the target object.

In this quantitative relational example between the % binocular disparity amount D and the pop-up amount and the pull-in amount of the target object, for example, in a case where 5% binocular disparity amount D is set, in the image display device of 700 inches, the viewer can perceive a pull-in amount (a) of 10 m or more. In contrast, in the image display device of 40 inches, the viewer can perceive a pull-in amount (b) as short as several m, and in the image display device of 11 inches, the viewer can only sense a pull-in amount (c) equal to or smaller than 1 m. That is, as shown in FIG. 21, in a case where an image to which the % binocular disparity amount D is added for realizing the pop-up amount, the pull-in amount, and the like intended by the image creator is directly displayed on a display for the household use, there is a problem that it is difficult for the user to perceive the pop-up amount and the pull-in amount intended by the image creator with the related art technology or the technology disclosed in Japanese Patent No. 3749227.

In view of the above, the present invention has been made to solve the above-mentioned problem, and it is desirable to provide a three-dimensional image correction device in which a correction method for a disparity amount of a binocular disparity image is devised so as to accurately express a pop-up amount, a pull-in amount, and the like intended by an image creator, and also a three-dimensional image compliant with an intention of the image creator can be provided to a viewer, a three-dimensional image correction method, a three-dimensional image display device, a three-dimensional image reproduction device, a three-dimensional image provision system, a program, and a recording medium.

The above-mentioned problems are solved by a three-dimensional image correction device according to an embodiment of the present invention including: when a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to eyes of a viewer, substantially approximated by (the pixel displacement amount)/(the standard visual distance) is set as a disparity amount, a width of a depth amount represented by pop-up and pull-in of the three-dimensional image is set as a dynamic range, and information related to a specification of a display device is set as display device information, a disparity amount detection unit configured to input the image information for the three-dimensional image to detect the disparity amount from the image information; a correction computation unit configured to adjust the disparity amount detected by the disparity amount detection unit on the basis of the display device information to correct the dynamic range; and a disparity amount correction unit configured to correct the disparity amount in the dynamic range corrected by the correction computation unit while corresponding to the display device information.

With the three-dimensional image correction device according to the embodiment of the present invention, the disparity amount detection unit inputs, for example, the image information for the three-dimensional image composed of the image for the left eye and the image for the right eye to detect the disparity amount from the image information. The correction computation unit adjusts the disparity amount detected by the disparity amount detection unit on the basis of the display device information to correct the dynamic range. The disparity amount correction unit corrects the disparity amount in the dynamic range corrected by the correction computation unit while corresponding to the display device information. Therefore, it is possible to adjust the pop-up amount, the pull-in amount, and the like of the target object while corresponding to the display device information.

According to an embodiment of the present invention, there is provided a three-dimensional image correction method performed by a three-dimensional image correction device, the method including the steps of: when a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to eyes of a viewer, substantially approximated by (the pixel displacement amount)/(the standard visual distance) is set as a disparity amount, a width of a depth amount represented by pop-up and pull-in of the three-dimensional image is set as a dynamic range, and information related to a specification of a display device is set as display device information, inputting the image information for the three-dimensional image to detect the disparity amount from the image information; adjusting the detected disparity amount on the basis of the display device information to correct the dynamic range; and correcting the disparity amount in corrected the dynamic range while corresponding to the display device information.

With the three-dimensional image correction method according to the embodiment of the present invention, it is possible to adjust the pop-up amount, the pull-in amount, and the like of the target object while corresponding to the display device information.

According to an embodiment of the present invention, there is provided a three-dimensional image display device including: display means configured to input image information for a three-dimensional image composed of an image for a left eye and an image for a right eye to display a video picture; and three-dimensional image correction means configured to output image information for the three-dimensional image after a disparity amount correction on the display means, the three-dimensional image correction means including, when a displacement amount which is a difference between a convergence angle on a display surface and a convergence angle on a three-dimensional surface to be perceived based on the image information for the three-dimensional image and which is, between a pixel displacement amount of a binocular disparity image on the display surface and a standard visual distance from the display surface to eyes of a viewer, substantially approximated by (the pixel displacement amount)/(the standard visual distance) is set as a disparity amount, a width of a depth amount represented by pop-up and pull-in of the three-dimensional image is set as a dynamic range, and information related to a specification of a display device is set as display device information, a disparity amount detection unit configured to input the image information for the three-dimensional image composed of the image for the left eye and the image for the right eye to detect the disparity amount from the image information, a correction computation unit configured to adjust the disparity amount detected by the disparity amount detection unit on the basis of the display device information to correct the dynamic range, and a disparity amount correction unit configured to correct the disparity amount in the dynamic range corrected by the correction computation unit while corresponding to the display device information.

With the three-dimensional image display device according to the embodiment of the present invention, the three-dimensional image correction device according to the embodiment of the present invention is applied to the three-dimensional image correction means, and it is therefore possible to adjust the pop-up amount, the pull-in amount, and the like of the target object while corresponding to the display device information.

According to an embodiment of the present invention, there is provided a three-dimensional image reproduction device including: reproduction means configured to reproduce image information for a three-dimensional image composed of an image for a left eye and an image for a right eye to display a video picture; and three-dimensional image correction means configured to correct a disparity amount of the reproduced image information by the reproduction means to output the image information for the three-dimensional image after the disparity amount correction, the three-dimensional image correction means including, when a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to eyes of a viewer, substantially approximated by (the pixel displacement amount)/(the standard visual distance) is set as a disparity amount, a width of a depth amount represented by pop-up and pull-in of the three-dimensional image is set as a dynamic range, and information related to a specification of a display device is set as display device information, a disparity amount detection unit configured to input the image information for the three-dimensional image composed of the image for the left eye and the image for the right eye to detect the disparity amount from the image information, a correction computation unit configured to adjust the disparity amount detected by the disparity amount detection unit on the basis of the display device information to correct the dynamic range, and a disparity amount correction unit configured to correct the disparity amount in the dynamic range corrected by the correction computation unit while corresponding to the display device information.

With the three-dimensional image reproduction device according to the embodiment of the present invention, the three-dimensional image correction device according to the embodiment of the present invention is applied to the three-dimensional image correction means, and it is therefore possible to adjust the pop-up amount, the pull-in amount, and the like of the target object while corresponding to the display device information.

According to an embodiment of the present invention, there is provided a first three-dimensional image provision system including: a three-dimensional image reproduction device configured to reproduce image information for a three-dimensional image composed of an image for a left eye and an image for a right eye from a predetermined information recording medium; and a three-dimensional image display device configured to input the image information for the three-dimensional image reproduced by the three-dimensional image reproduction device to display a video picture, the three-dimensional image reproduction device including three-dimensional image correction means configured to output image information for the three-dimensional image after a displacement amount correction to the three-dimensional image display device, and the three-dimensional image correction means including, when a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to eyes of a viewer, substantially approximated by (the pixel displacement amount)/(the standard visual distance) is set as a disparity amount, a width of a depth amount represented by pop-up and pull-in of the three-dimensional image is set as a dynamic range, and information related to a specification of a display device is set as display device information, a disparity amount detection unit configured to input the image information for the three-dimensional image composed of the image for the left eye and the image for the right eye to detect the disparity amount from the image information, a correction computation unit configured to adjust the disparity amount detected by the disparity amount detection unit on the basis of the display device information to correct the dynamic range, and a disparity amount correction unit configured to correct the disparity amount in the dynamic range corrected by the correction computation unit while corresponding to the display device information.

With the first three-dimensional image provision system according to the embodiment of the present invention, the three-dimensional image reproduction device according to the embodiment of the present invention is applied, and therefore on the three-dimensional image reproduction device side, it is possible to adjust the pop-up amount, the pull-in amount, and the like of the target object while corresponding to the display device information.

According to an embodiment of the present invention, there is provided a second three-dimensional image provision system including: a three-dimensional image reproduction device configured to reproduce image information for a three-dimensional image composed of an image for a left eye and an image for a right eye from a predetermined information recording medium; and a three-dimensional image display device configured to input the image information for the three-dimensional image reproduced by the three-dimensional image reproduction device to display a video picture, the three-dimensional image display device including three-dimensional image correction means configured to input the image information output from the three-dimensional image reproduction device to output image information for the three-dimensional image after a disparity amount correction, and the three-dimensional image correction means including, when a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to eyes of a viewer, substantially approximated by (the pixel displacement amount)/(the standard visual distance) is set as a disparity amount, a width of a depth amount represented by pop-up and pull-in of the three-dimensional image is set as a dynamic range, and information related to a specification of a display device is set as display device information, a disparity amount detection unit configured to input the image information for the three-dimensional image composed of the image for the left eye and the image for the right eye to detect the disparity amount from the image information, a correction computation unit configured to adjust the disparity amount detected by the disparity amount detection unit on the basis of the display device information to correct the dynamic range, and a disparity amount correction unit configured to correct the disparity amount in the dynamic range corrected by the correction computation unit while corresponding to the display device information.

With the second three-dimensional image provision system according to the embodiment of the present invention, the three-dimensional image display device according to the embodiment of the present invention is applied, and therefore on the three-dimensional image display device side, it is possible to adjust the pop-up amount, the pull-in amount, and the like of the target object while corresponding to the display device information.

According to an embodiment of the present invention, there is provided a computer-readable program including the steps of: when a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to eyes of a viewer, substantially approximated by (the pixel displacement amount)/(the standard visual distance) is set as a disparity amount, a width of a depth amount represented by pop-up and pull-in of the three-dimensional image is set as a dynamic range, and information related to a specification of a display device is set as display device information, inputting the image information for the three-dimensional image to detect the disparity amount from the image information; adjusting the detected disparity amount on the basis of the display device information to correct the dynamic range; and correcting the disparity amount in corrected the dynamic range while corresponding to the display device information.

According to an embodiment of the present invention, there is provided a computer-readable recording medium describing a program including the steps of: when a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to eyes of a viewer, substantially approximated by (the pixel displacement amount)/(the standard visual distance) is set as a disparity amount, a width of a depth amount represented by pop-up and pull-in of the three-dimensional image is set as a dynamic range, and information related to a specification of a display device is set as display device information, inputting the image information for the three-dimensional image to detect the disparity amount from the image information; adjusting the detected disparity amount on the basis of the display device information to correct the dynamic range; and correcting the disparity amount in corrected the dynamic range while corresponding to the display device information.

With the three-dimensional image correction device and the three-dimensional image correction method according to the embodiment of the present invention, the correction computation unit configured to correct the dynamic range on the basis of the disparity amount detected from the image information for the three-dimensional image composed of the image for the left eye and the image for the right eye and the display device information is provided, and the disparity amount correction unit corrects the disparity amount in the dynamic range after the correction while corresponding to the display device information.

With this configuration, it is possible to adjust the pop-up amount, the pull-in amount, and the like of the target object while corresponding to the display device information. Therefore, even in a case where the specifications of the display devices are varied, not only it is possible to realize the pop-up amount, the pull-in amount, and the like preferred by the viewer, but also it is possible to accurately express the pop-up amount, the pull-in amount, and the like intended by the image creator. As a result, it is possible to allow the viewer to perceive the three-dimensional image compliant with the intention of the image creator.

With the three-dimensional image display device according to the embodiment of the present invention, as the three-dimensional image correction device according to the embodiment of the present invention is applied to the three-dimensional image correction means, it is possible to adjust the pop-up amount, the pull-in amount, and the like of the target object while corresponding to the display device information. Therefore, even in a case where the specifications of the three-dimensional image display devices are varied, not only it is possible to realize the pop-up amount, the pull-in amount, and the like preferred by the viewer, but also it is possible to accurately express the pop-up amount, the pull-in amount, and the like intended by the image creator. As a result, it is possible to allow the viewer to perceive the three-dimensional image compliant with the intention of the image creator.

With the three-dimensional image reproduction device according to the embodiment of the present invention, as the three-dimensional image correction device according to the embodiment of the present invention is applied to the three-dimensional image correction means, it is possible to adjust the pop-up amount, the pull-in amount, and the like of the target object while corresponding to the display device information. Therefore, even in a case where the specifications of the three-dimensional image display devices are varied, not only it is possible to realize the pop-up amount, the pull-in amount, and the like preferred by the viewer, but also it is possible to accurately express the pop-up amount, the pull-in amount, and the like intended by the image creator. As a result, it is possible to allow the viewer to perceive the three-dimensional image compliant with the intention of the image creator.

With the first three-dimensional image provision system according to the embodiment of the present invention, as the three-dimensional image reproduction device according to the embodiment of the present invention is applied, on the three-dimensional image reproduction device side, it is possible to adjust the pop-up amount, the pull-in amount, and the like of the target object while corresponding to the display device information. Therefore, even in a case where the specifications of the three-dimensional image display devices are varied, not only it is possible to realize the pop-up amount, the pull-in amount, and the like preferred by the viewer, but also it is possible to accurately express the pop-up amount, the pull-in amount, and the like intended by the image creator. As a result, it is possible to allow the viewer to perceive the three-dimensional image compliant with the intention of the creator.

With the second three-dimensional image provision system according to the embodiment of the present invention, as the three-dimensional image display device according to the embodiment of the present invention is applied, on the three-dimensional image display device side, it is possible to adjust the pop-up amount, the pull-in amount, and the like of the target object while corresponding to the display device information. Therefore, even in a case where the specifications of the three-dimensional image display devices are varied, not only it is possible to realize the pop-up amount, the pull-in amount, and the like preferred by the viewer, but also it is possible to accurately express the pop-up amount, the pull-in amount, and the like intended by the image creator. As a result, it is possible to allow the viewer to perceive the three-dimensional image compliant with the intention of the creator.

With the program and the recording medium according to the embodiment of the present invention, on the basis of the program read from the recording medium, the dynamic range can be corrected by using the disparity amount detected from the image information for the three-dimensional image composed of the image for the left eye and the image for the right eye and the display device information, and the disparity amount can be adjusted with satisfactory reproducibility in the dynamic range after the correction while corresponding to the display device information. As a result, even in a case where the binocular disparity image is displayed on a large screen exceeding 500 inches in a cinema, for example, or even in a case where the binocular disparity image is displayed on a display device of a several tens of inches in the household, the viewers can perceive the pop-up amount and the pull-in amount of the object which reflect the creative intention of the image creator.

BRIEF DESCRIPTION OF THE DRAWINGS

FIG. 17 is a table summarizing numerical examples among screen sizes of seven types of the image display devices shown in FIG. 16, the % binocular disparity amount, and a distance to the target object (part 1);
FIG. 18 is a table summarizing numerical examples showing a relation with the above-mentioned distance (part 2);
FIG. 19 is a table summarizing numerical examples showing a relation with the above-mentioned distance (part 3);
FIG. 20 is a table summarizing numerical examples showing a relation with the above-mentioned distance (part 4)

DESCRIPTION OF THE PREFERRED EMBODIMENTS

Hereinafter, with reference to the drawings, a three-dimensional image correction device, a three-dimensional image correction method, a three-dimensional image display device, a three-dimensional image reproduction device, a three-dimensional image provision system, a program, and a recording medium according to an embodiment of the present invention will be described.

First Embodiment

Figure 1:
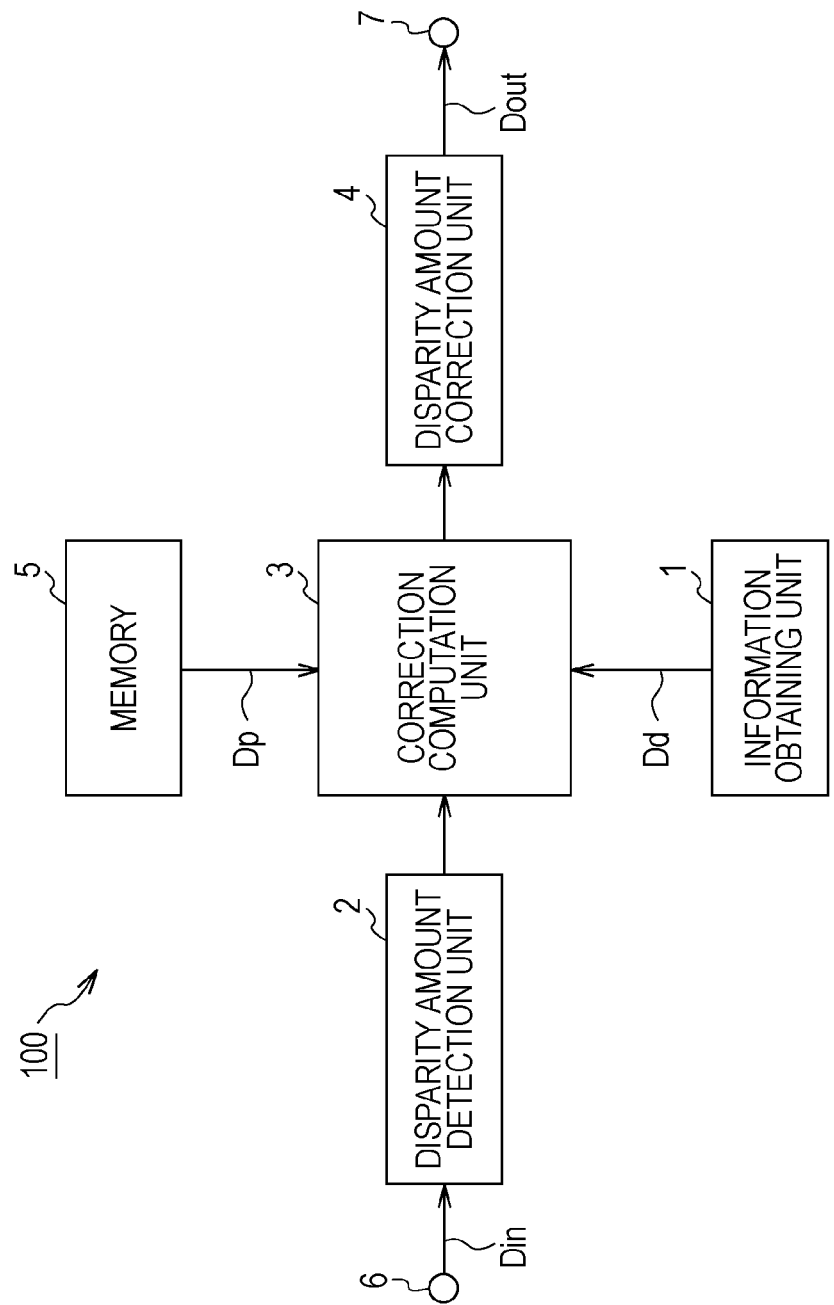
FIG. 1 is a block diagram showing a configuration example of a three-dimensional image correction device according to a first embodiment of the present invention.

FIG. 1 is a block diagram showing a configuration example of the three-dimensional image correction device 100 according to a first embodiment of the present invention. The three-dimensional image correction device 100 shown in FIG. 1 is a device applicable to a system configured to present a three-dimensional image to a viewer having liquid crystal shutter glasses or the like mounted thereon. The three-dimensional image correction device 100 has a function of correcting a pop-up amount, a pull-in amount, and the like of the three-dimensional image to be perceived by the viewer. The three-dimensional image correction device 100 is constructed by including an information obtaining unit 1, a disparity amount detection unit 2, a correction computation unit 3, the disparity amount correction unit 4, a memory 5, an input terminal 6, and an output terminal 7.

The disparity amount detection unit 2 is connected to the input terminal 6, and image data Din for a three-dimensional image composed of an image for the left eye and an image for the right eye is input to detect the disparity amount of the binocular disparity image from the above-mentioned image data Din. The disparity amount herein is a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to eyes of a viewer, substantially approximated by (the pixel displacement amount)/(the standard visual distance). The disparity amount detection unit 2 detects the displacement amount generated between the image for the left eye and the image for the right eye which target the same object. Image data Din is input via the input terminal 6 to the disparity amount detection unit 2. A detection method for a binocular disparity amount D in the disparity amount detection unit 2 is not limited to a particular method. For the disparity amount detection unit 2, for example, a digital signal processor (hereinafter referred to as DSP) is used.

The correction computation unit 3 is connected to the disparity amount detection unit 2. By adjusting the binocular disparity amount D detected by the disparity amount detection unit 2 on the basis of display device data Dd, a dynamic range is corrected. The dynamic range herein refers to a width of a depth amount represented by the pop-up and the pull-in of the three-dimensional image. For example, in a case where it is seen that the most popped up part in the three-dimensional image displayed on the display device is 1 m in front of the display surface, and the most pulled in part is 2 m behind the display surface, the dynamic range is total 3 m with 1 m on the front and 2 m on the behind. The display device data Dd refers to information related to a specification of the image display device. The display device data Dd includes information related to a size of the display screen indicating a displayable area of the image display device. For the correction computation unit 3, for example, a central processing unit (hereinafter referred to as CPU) is used.

On the basis of the display device data Dd obtained by the information obtaining unit 1 and the binocular disparity amount D detected by the disparity amount detection unit 2, the correction computation unit 3 executes a computation for correcting at least one of the dynamic ranges of the pop-up and the pull-in of the object. For example, the correction computation unit 3 adjusts the binocular disparity amount D detected by the disparity amount detection unit 2 on the basis of the display device data Dd to compute correction information for correcting at least one of the dynamic ranges of the pop-up and the pull-in (see FIG. 2).

The disparity amount correction unit 4 is connected to the correction computation unit 3. The disparity amount correction unit 4 is operated so as to correct the binocular disparity amount D in the dynamic range corrected by the correction computation unit 3 while corresponding to the display device data Dd. The output terminal 7 is connected to the disparity amount correction unit 4. An image output unit not shown in the drawing is connected to the output terminal 7.

On the basis of the computation result obtained by the correction computation unit 3, the disparity amount correction unit 4 corrects the original binocular disparity amount D obtained by the disparity amount detection unit 2. For example, the dynamic range is corrected on the basis of the correction information computed by the correction computation unit 3 to correct the binocular disparity amount D by combining the dynamic range after the correction and the detected binocular disparity amount D. In this example, the binocular disparity amount D on the display screen of the image display device is corrected, the disparity amount correction unit 4 corrects at least one of the dynamic ranges of the pop-up and the pull-in of the three-dimensional image. A method of correcting the binocular disparity amount D in the disparity amount correction unit 4 will be described with reference to FIGS. 5 to 7. For the disparity amount correction unit 4, for example, a DSP is used.

The information obtaining unit 1 is connected to the correction computation unit 3 and obtains the information related to a specification of an image display device used by the viewer such as a liquid crystal display panel or a PDP display panel. The information obtained at this time is the display device data Dd. As long as the display device data Dd includes information related to the size of the displayable area of the image display device and the displayable resolution, EDID (Extended Display Identification Data) regulated by VESA (Video Electronics Standards Association) may be used, or an original format may also be used. In addition to the information related to the size, the resolution, and the like, the display device data Dd desirably includes information for identifying a display method of the liquid crystal display, the plasma display (PDP), the organic EL display, and the like. For the information obtaining unit 1, operation tools such as a key board and a mouth are used.

In this example, in addition to the information obtaining unit 1, the memory 5 is also connected to the correction computation unit 3. The memory 5 stores the display device data Dd transferred from the information obtaining unit 1. For the memory 5, other than a read-only memory (ROM), a random access memory (RAM) in which information can be written or read as the occasion demands, or the like, a non-volatile memory such as an EEPROM or a hard disk is used.

In the memory 5, in addition to the display device data Dd, a computer-readable system program is described. When, for example, the displacement amount generated between the image for the left eye and the image for the right eye which target the same object is set as the binocular disparity amount D, the range for correcting the binocular disparity amount D is set as the dynamic range, and the information related to the specification of the image display device is set as the display device data Dd, the system program has contents including the steps of inputting the image data Din for the three-dimensional image composed of the image for the left eye and the image for the right eye to detect to detect the binocular disparity amount D from the image data Din, adjusting the detected binocular disparity amount D on the basis of the display device data Dd to correct the dynamic range, and correcting the binocular disparity amount D in the dynamic range after the correction while corresponding to the display device data Dd, and the system program is stored as program data Dp.

A mapping table is prepared in which at least one of the dynamic ranges of the pop-up amount and the pull-in amount in the three-dimensional image and previously approximately associated correction values are described, and when the binocular disparity amount D on the display screen of the image display device is to be corrected, the disparity amount correction unit 4 refers to the mapping table to read out the correction value. As the reference is made to such a mapping table, it is possible to discretely expand at least one of the dynamic ranges of the pop-up amount and the pull-in amount in the three-dimensional image. Therefore, the binocular disparity amount D can be discretely adjusted, and it is possible to allow the viewer to perceive at least one of the pop-up amount and the pull-in amount in the three-dimensional image.

Figure 2:
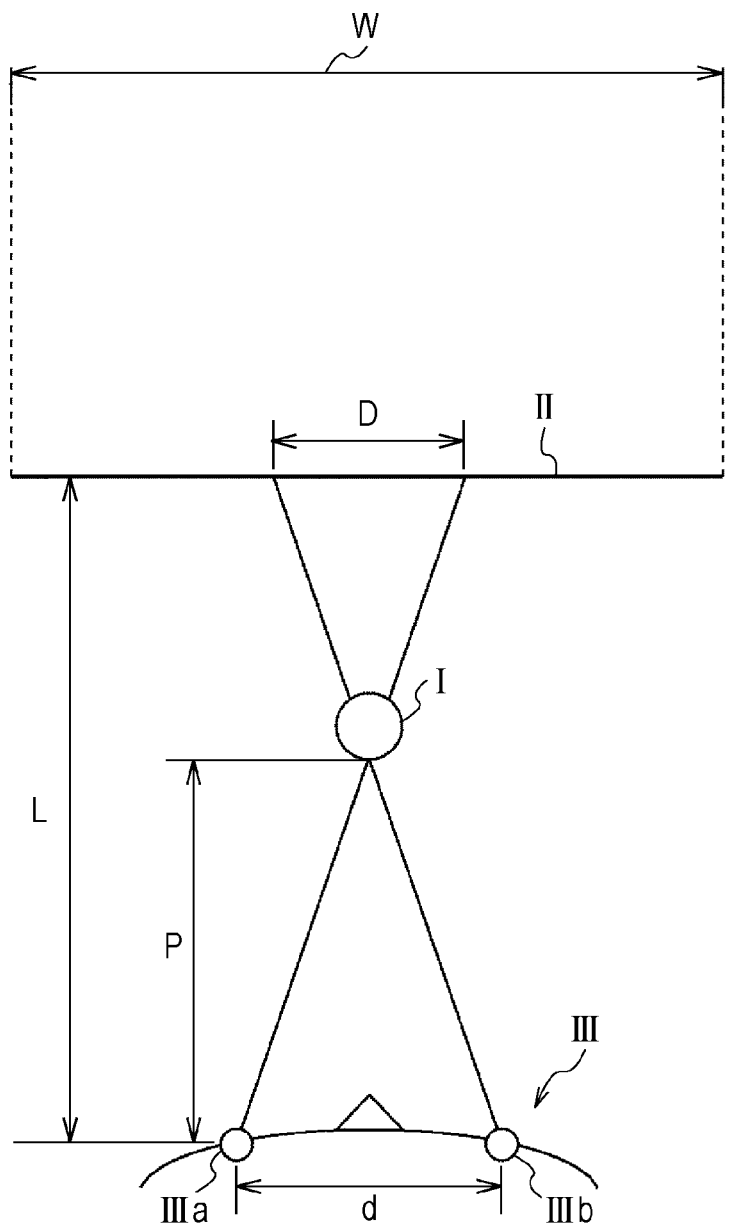
FIG. 2 is an explanatory diagram showing a relational example between a binocular disparity amount and a pop-up amount of a target object.

Subsequently, with reference to FIGS. 2 to 7, with regard to the three-dimensional image correction method according to the embodiment of the present invention, the operation example of the three-dimensional image correction device 100 will be described. FIG. 2 is an explanatory diagram for describing a relational example of the binocular disparity amount D and a pop-up amount of a target object I.

According to the relational example between the binocular disparity amount D and the pop-up amount of the target object I shown in FIG. 2, when a distance from a surface II of the image display device to eyes IVa and IVb of a viewer III is set as L, a pupillary distance of the viewer III is set as d, the disparity amount of the binocular disparity image is set as D, and a distance to the target object I perceived by the viewer III, from the following relational expression, the pop-up amount can be obtained.

$$D/(L-P)=d/P, (P<L) \quad (1)$$

The correction computation unit 3 shown in FIG. 1 computes the above-mentioned relational expression (1) to continuously adjust the binocular disparity amount D, so that the dynamic range of the pop-up amount (L−P) in the three-dimensional image can be continuously expanded. Regarding the above-mentioned distance L, when a height of the surface II of the image display device is set as H [m], L=3H is defined as a standard visual distance. It should be noted that in the drawing, W denotes a width [m] of the surface II of the image display device, which constitutes a screen size (H×W) together with the height H [m]. The screen size (H×W) forms a displayable area.

Figure 3:
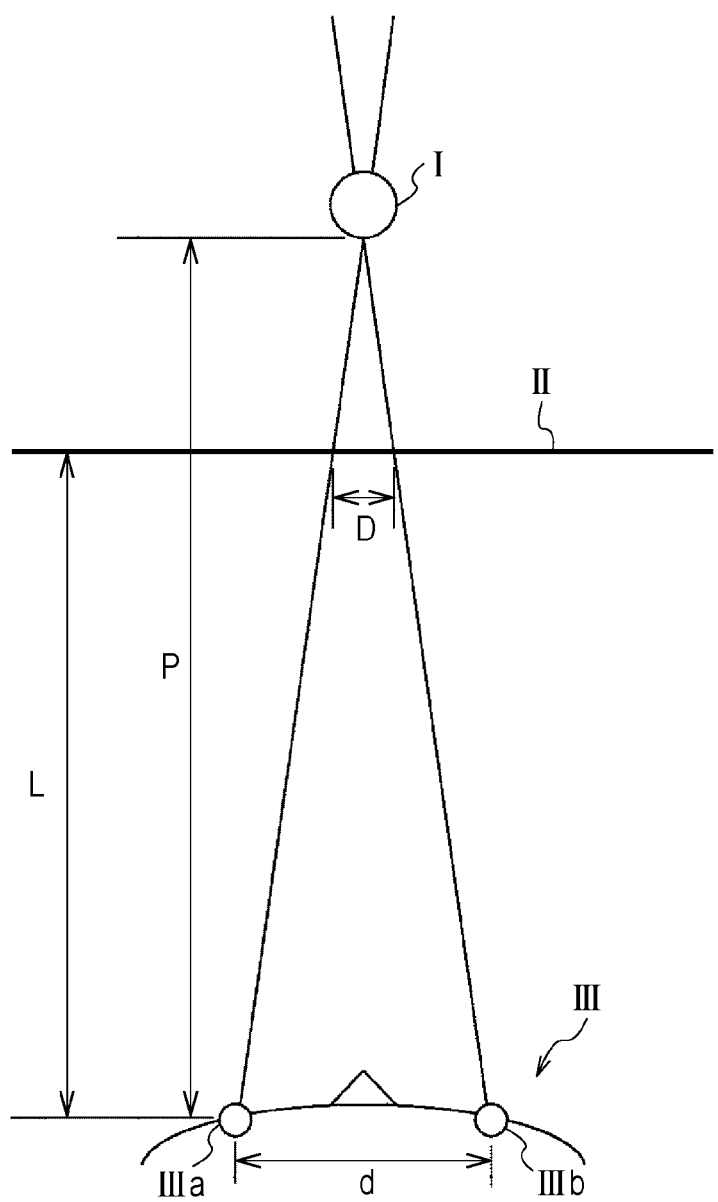
FIG. 3 is an explanatory diagram showing a relational example between the binocular disparity amount and a pull-in amount of the target object.

FIG. 3 is an explanatory diagram of a relational example between the binocular disparity amount D and a pull-in amount of the target object I. According to the relational example between the binocular disparity amount D and the pull-in amount of the target object I shown in FIG. 3, when the distance from the surface II of the image display device to the eyes of the viewer III is set as L, the pupillary distance of the viewer III is set as d, the binocular disparity amount is set as D, and the distance to the target object I to be perceived by the viewer III is set as P, from the following relational expression, the pull-in amount (P−L) can be obtained.

$$D/(P-L)=d/P, (P>L) \quad (2)$$

The above-mentioned correction computation unit 3 computes the relational expression (2) to continuously expand the dynamic range of the pull-in amount (P−L) in the three-dimensional image. Thus, the binocular disparity amount D can be continuously expanded.

As such relational expressions (1) and (2) correlate between the binocular disparity amount D and the pop-up amount, the pull-in amount, and the like are established, by correcting the binocular disparity amount D, it is possible to adjust the pop-up amount, the pull-in amount, and the like of the target object I. Also, when the relational expressions (1) and (2) are used, the correction computation unit 3 can continuously be expanded at least one of the dynamic ranges of the pop-up amount (L−P) and the pull-in amount (P−L) in the three-dimensional image. Therefore, as the binocular disparity amount D can be continuously expanded, it is possible to allow the viewer to sufficiently and smoothly perceive at least one of the pop-up amount and the pull-in amount in the three-dimensional image.

Figure 4:
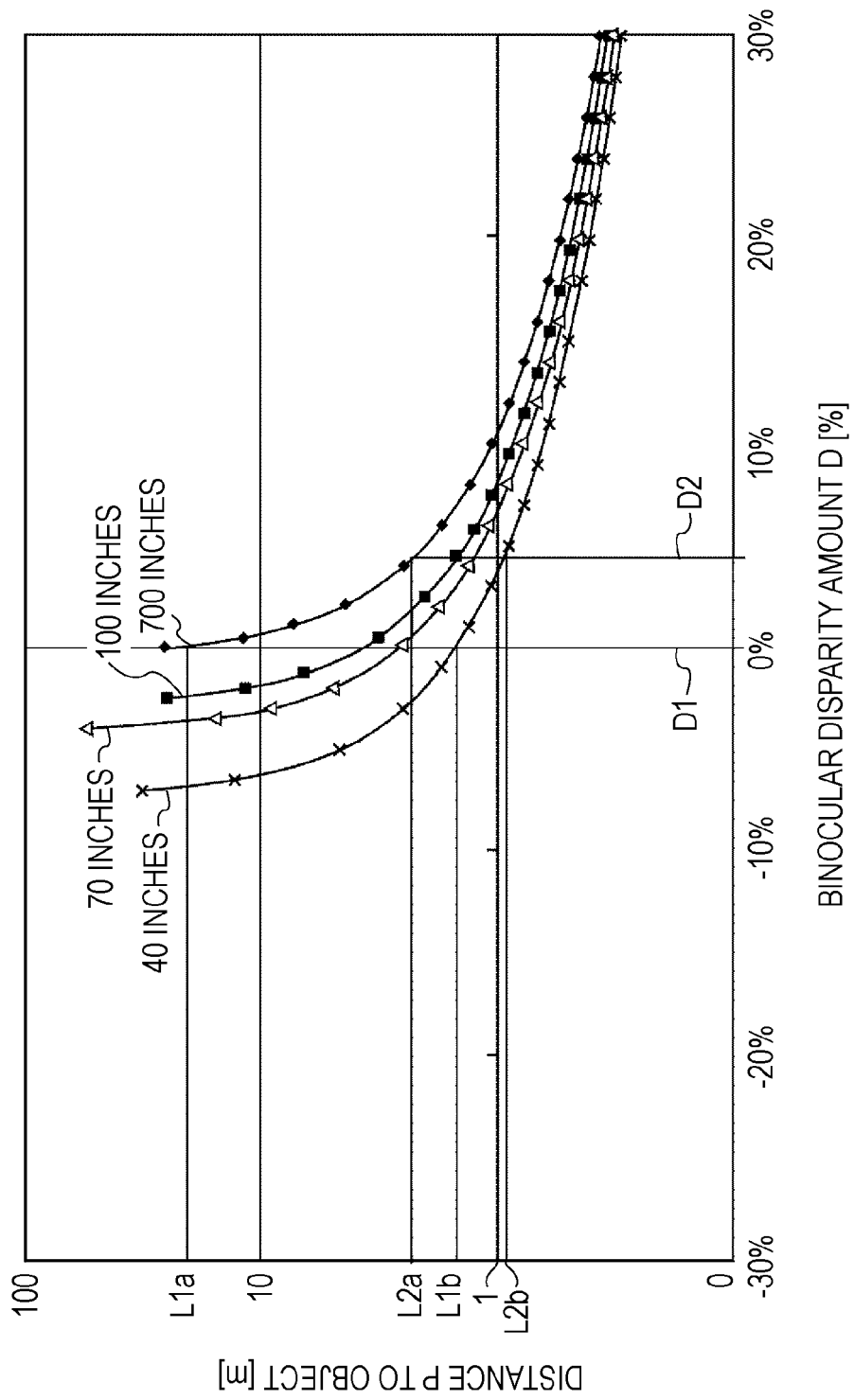
FIG. 4 is a graph chart showing a quantitative relational example between the binocular disparity amount and the pop-up amount and the pull-in amount of the target object (part 1)

FIG. 4 is a graph chart showing a quantitative relational example between the % binocular disparity amount D and the pop-up amount and the pull-in amount of the target object (part 1). The vertical axis shown in FIG. 4 is the distance L [m] to the target object I, which is represented in the logarithmic scale. The horizontal axis is the binocular disparity amount D (hereinafter referred to as % binocular disparity amount D) which is represented in the percentile [%], and the % binocular disparity amount D is the relative amount with respect to the width W of the displayable area of the image display device regulated by way of percentile [%]. Hereinafter, a case will be described in which while the size of the image is matched with the size of the displayable area of the image display device, the binocular disparity image is displayed.

Lozenge marks on the solid line shown in FIG. 4 form a characteristic curve showing a quantitative relational example between the binocular disparity amount D in the screen of 700 inches and the pop-up amount and the like of the target object. Rectangular marks on the solid line form a characteristic curve showing a quantitative relational example between the binocular disparity amount D in the image display device of 100 inches and the pop-up amount and the like of the target object I. Triangular marks on the solid line form a characteristic curve showing a quantitative relational example between the binocular disparity amount D in the image display device of 70 inches and the pop-up amount and the like of the target object I.

Cross marks on the solid line form a characteristic curve showing a quantitative relational example between the binocular disparity amount D in the image display device of 40 inches and the pop-up amount and the like of the target object I. It should be noted that in FIGS. 16 to 20, the graphic representations showing the quantitative relational examples between the % binocular disparity amount D in the seven types of the image display devices including 700 inches, 100 inches, 70 inches, and 40 inches and the pop-up amount and the pull-in amount of the target object and the distances to the target object to be perceived are summarized in the table.

In FIG. 4, for example, as to the image created while supposing the screen of 700 inches, in order to allow the viewer III to perceive the desired depth such as the pop-up and the pull-in of the target object I, the dynamic rage is set so that the % binocular disparity amount D is between D1 (0%) and D2 (5%). In that case, the viewer III viewing with the display screen of 700 inches perceives that the target object I exists between distances L1a and L2a.

Next, in a case where the same binocular disparity image is viewed with the image display device having the displayable area of 40 inches, the % binocular disparity amount D assigned to the binocular disparity image is relatively regulated by the width of the displayable area, and therefore the % binocular disparity amount D is between D1 and D2. In that case, the viewer III viewing with the display screen of 40 inches perceives that the target object I exists between distances L1b and L2b. At this time, it is found out from the relation of FIG. 4 (proportional reduction) that a relation of an expression (3) is established.

$$|L2a-L1a|>|L2b-L1b| \quad (3)$$

In this manner, if the size of the binocular disparity image is adjusted only to the screen size of the displayable area of the image display device, the pop-up amount and the pull-in amount intended by the image creator are not reflected, and the image whose depth is compressed is displayed.

In view of the above, with the three-dimensional image correction method according to the embodiment of the present invention, in order that the pop-up amount, the pull-in amount, and the like intended by the image creator are reflected, the % binocular disparity amount D is corrected in accordance with the screen size of the displayable area of the image display device. For the correction method, two methods are exemplified including a method of accurately reproducing the binocular disparity amount D intended by the image creator and a method of expanding the dynamic ranges of the pop-up amount and the pull-in amount.

Figure 5:
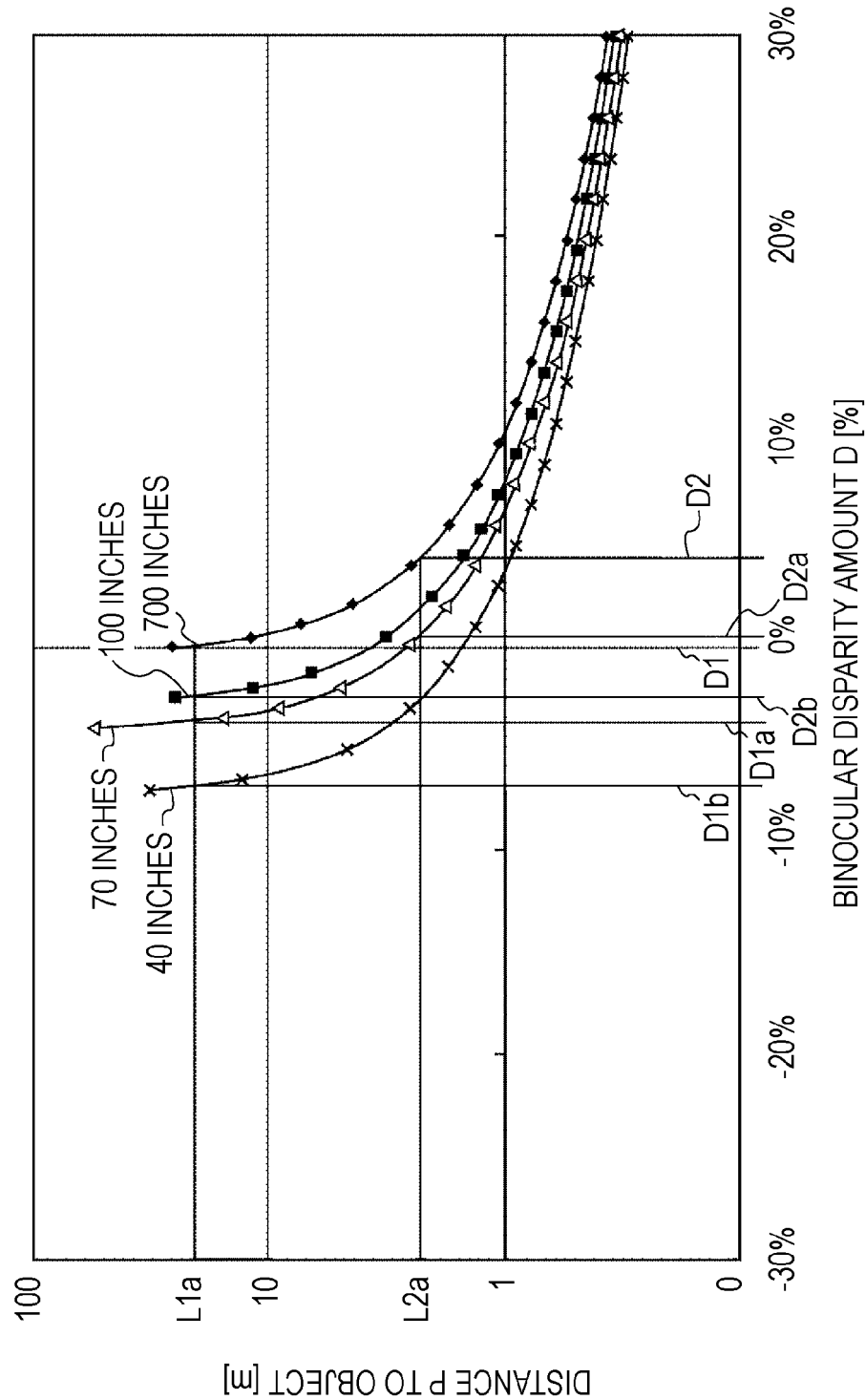
FIG. 5 is a graph chart showing a quantitative relational example between the binocular disparity amount and the pop-up amount and the pull-in amount of the target object (part 2)

FIG. 5 is a graph chart showing a quantitative relational example between the % binocular disparity amount D and the pop-up amount and the pull-in amount of the target object (part 2). In FIG. 5, the vertical axis is the distance L [m] to the object, which is represented in the logarithmic scale. The horizontal axis is the % binocular disparity amount D, which is represented in the percentile [%].

First, on the basis of the example shown in FIG. 4, in a case where the binocular disparity amount D intended by the image creator is accurately reproduced, for example, as to the image created while supposing the screen of 700 inches, when the % binocular disparity amount D is set as the largest D1 (0%), the viewer III perceives that the target object I exists between the distances L1a and L2a.

When the target object I exists between the distances L1a and L2a, in order to allow the viewer III to perceive, a method is adopted in which a correction target value shown in FIG. 5 is set, and the dynamic range is shifted to the correction target value. According to this method, the binocular disparity amount D in accordance with the screen size of the displayable area of the image display device is provided to the binocular disparity image. For example, in a case where the screen size of the displayable area of the image display device is 70 inches, so that the binocular disparity amount D is between D1a and D2a, the correction computation unit 3 shown in FIG. 1 corrects the dynamic range, and in a case where the screen size of the displayable area of the image display device is 40 inches, so that the binocular disparity amount D is between D1b and D2b, the correction computation unit 3 corrects the dynamic range.

Figure 6:
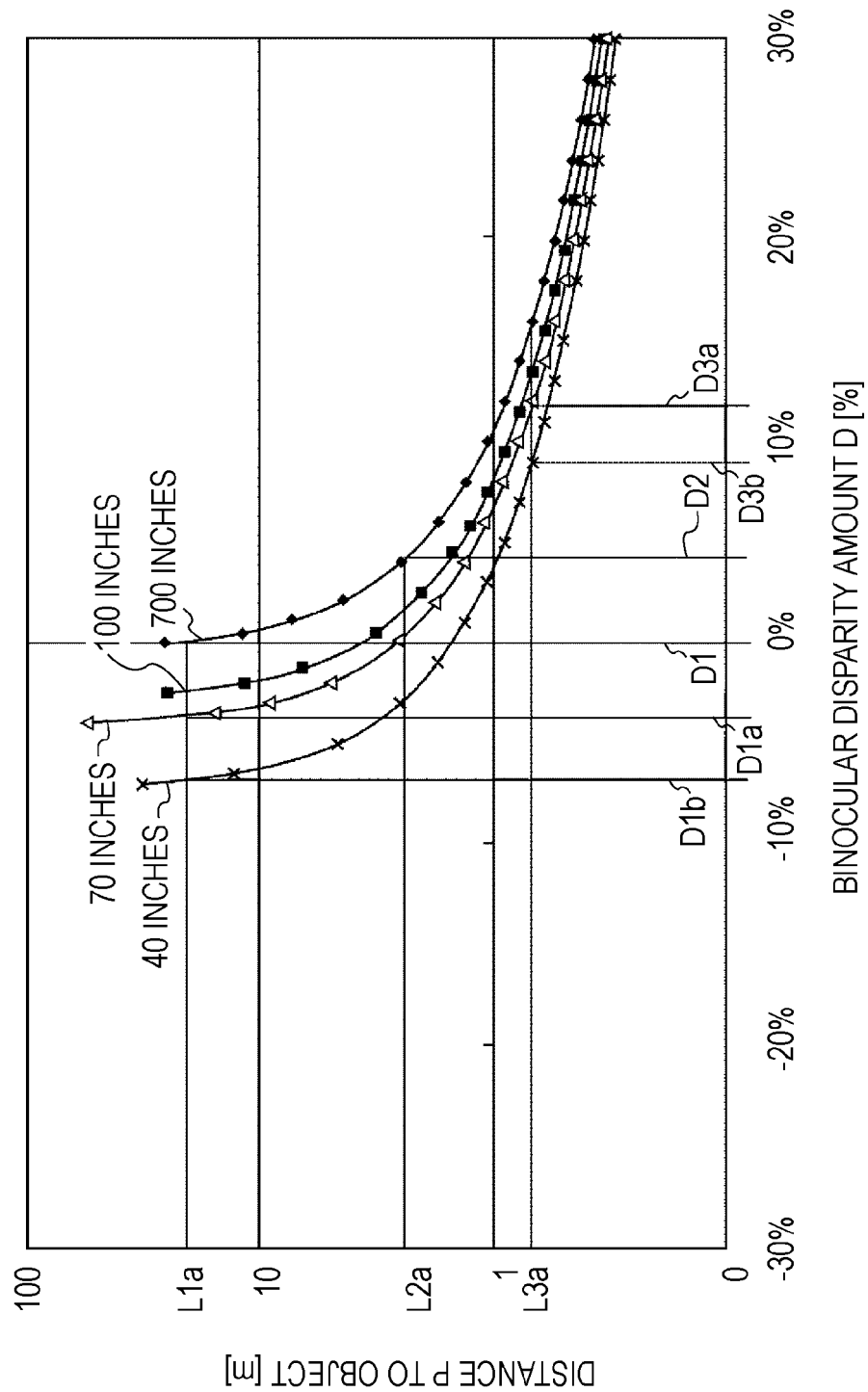
FIG. 6 is a graph chart showing a quantitative relational example between the binocular disparity amount and the pop-up amount and the pull-in amount of the target object (part 3)

Next, on the basis of the example shown in FIG. 4, the method of expanding the dynamic ranges of the pop-up amount and the pull-in amount will be described. FIG. 6 is a graph chart showing a quantitative relational example between the % binocular disparity amount D and the pop-up amount and the pull-in amount of the target object (part 3). In FIG. 6, the vertical axis is the distance L [m] to the target object I, which is represented in the logarithmic scale. The horizontal axis is the binocular disparity amount D, which is represented in the percentile [%].

For example, as to the image created while supposing the screen of 700 inches, when the largest binocular disparity amount D of the image=D2−D1 is set, the viewer III perceives that the target object I exists between the distances L1a and L2a. At this time, in a case where a further pop-up feeling is desired to be provided to the viewer III, the dynamic range is set so that the distance P to the target object I exists between the distance L1a and L3a (L3a<L2a).

The method of expanding the dynamic ranges of the pop-up amount and the pull-in amount shown in FIG. 6 is adopted, in a case where the screen size of the displayable area of the image display device is 70 inches, the computation is carried out in such a manner that the correction computation unit 3 shown in FIG. 1 corrects the dynamic range so that the binocular disparity amount D is between D1a and D3a. Also, in a case where the screen size of the displayable area of the image display device is 40 inches, the correction computation unit 3 corrects the dynamic range so that the binocular disparity amount D is D1b between D3b.

The computation of correcting the dynamic range is executed while the correction computation unit 3 shown in FIG. 1 uses the relational expressions (1) and (2). The correction computation unit 3 calculates the binocular disparity amount D comparable to the pop-up amount, the pull-in amount, and the like intended by the image creator. With this calculation, even in the case of the screen size of the displayable area of the image display device used by the viewer III, it is possible to realize the pop-up amount and the pull-in amount intended by the image creator.

It should be noted that when the disparity amount D of the binocular disparity image on the display screen of the image display device is corrected, for each screen size of the image display device, relations between the pop-up amount and the pull-in amount and the binocular disparity amount D are previously set in a table, and the binocular disparity amount D is calculated on the basis of the value stored in the table, so that the desired pop-up amount, the pull-in amount, and the like may be realized.

For example, a mapping table describing at least one of the dynamic ranges of the pop-up amount and the pull-in amount in the three-dimensional image and previously approximately associated correction values is prepared. As the reference is made to such a mapping table, it is possible to discretely expand at least one of the dynamic ranges of the pop-up amount and the pull-in amount in the three-dimensional image for the correction. Therefore, it is possible to allow the viewer to sufficiently perceive at least one of the pop-up amount and the pull-in amount in the three-dimensional image.

In addition, in a case where the screen size is equal to or larger than 40 inches, an HD (High Definition) resolution of 1920 pixels wide and 1080 lines long is provided in many cases, but in a case where the screen size smaller than 40 inches, a resolution of only 1366 pixels wide and 768 lines long is provided in some cases. In general, the standard visual distance is decided on the basis of the screen size and the resolution. As shown in FIGS. 4 to 6, the characteristic curves drawn by way of the screen sizes showing the quantitative relational examples between the % binocular disparity amount D in the image display device of 11 inches and the pop-up amount and the pull-in amount of the target object are varied.

Figure 7:
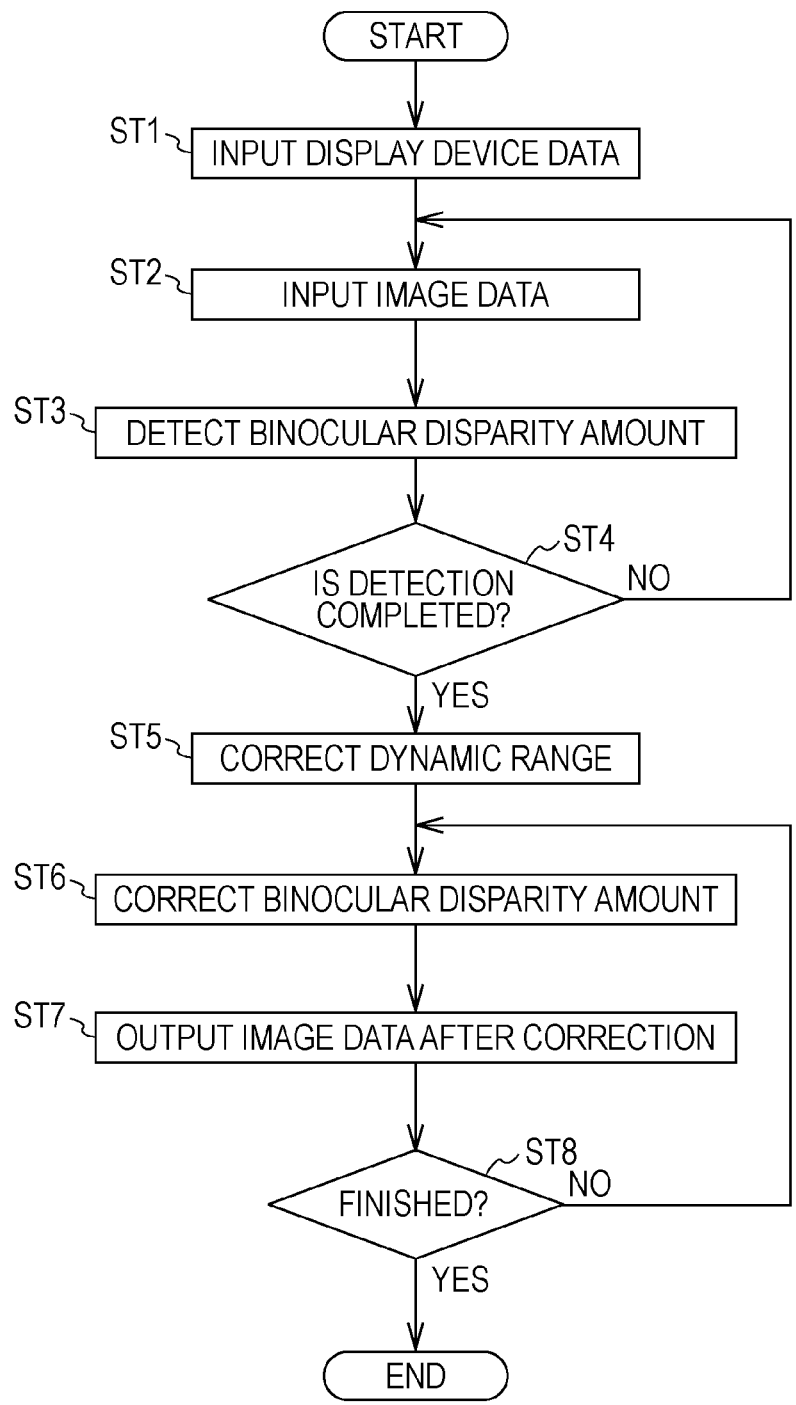
FIG. 7 is a flow chart showing an operational example of the three-dimensional image correction device.

FIG. 7 is a flow chart showing an operational example of the three-dimensional image correction device 100. According to the present embodiment, the displacement amount generated between the image for the left eye and the image for the right eye which target the same object is set as the % binocular disparity amount D, the range for correcting the % binocular disparity amount D is set as the dynamic range, and the information related to the specification of the image display device is set as the display device data Dd. The display device data Dd includes information related to the information related to the screen size and the resolution representing the displayable area of the image display device.

The above-mentioned factors are set as the three-dimensional image correction conditions, and in the three-dimensional image correction device 100, in step ST1 in the flow chart of FIG. 7, the information obtaining unit 1 obtains a specification of the image display device to input the display device data Dd. For example, the information obtaining unit 1 obtains information related to the screen size of the displayable area of the image display device used by the viewer III, the displayable resolution, and the like to be stored in the memory 60. With regard to the information related to the screen size and the like, the EDID regulated by VESA may be used, or an original format may also be used. In the display device data Dd, information for identifying a display method for the liquid crystal display, the plasma display, the organic EL display, and the like may be included.

Next, in step ST2, the three-dimensional image correction device 100 inputs the image data Din for the three-dimensional image composed of the image for the left eye and the image for the right eye. The image data Din is input via the input terminal 6 to the disparity amount detection unit 2. After that, in step ST3, the disparity amount detection unit 2 detects the binocular disparity amount D from the image data Din. For the detection method for the binocular disparity amount D, a general method may be used, and the system thereof is not limited to a particular system. The % binocular disparity amount D added at this time point is set by the image creator while supposing the image display device having a particular screen size, and the pop-up amount and the pull-in amount of the object are different from those intended by the creator in the image display device having a different screen size.

In step ST4, it is determined whether all the detections for the binocular disparity amount D are finished or not. In a case where the detections for the binocular disparity amount D are not finished, and the flow is returned to step ST2 to repeatedly perform the above-mentioned processing. In a case where the detections for the binocular disparity amount D are all finished, the flow is shifted to step ST5.

In step ST5, the correction computation unit 3 adjusts the previously detected binocular disparity amount D on the basis of the display device data Dd to correct the dynamic range. For example, the correction information for correcting at least one of the dynamic ranges of the pop-up amount and the pull-in amount is computed on the basis of the screen size of the displayable area of the image display device obtained in step ST1, the information related the displayable resolution and the like, and the binocular disparity amount D detected in step ST3. The dynamic range is corrected on the basis of the correction information computed at this time.

In the computation for correcting the dynamic range, the standard visual distance from the surface II of the image display device to eyes Iva and IVb of the viewer III is set as L, the pupillary distance of the viewer III is set as d, the binocular disparity amount is set as D, and the distance to the target object I to be perceived by the viewer III is set as P which can be obtained from the screen size of the displayable area, the information related to the displayable resolution, and the like, the relation of the expression (1) described according to FIG. 2 is established, and the relation of the expression (2) described according to FIG. 3 is established.

From these relational expressions, the correction computation unit 3 obtains the pop-up amount (L−P) and the pull-in amount (P−L). When such relational expressions (1) and (2) are used, at least one of the dynamic ranges of the pop-up amount (L−P) and the pull-in amount (P−L) in the three-dimensional image can be continuously expanded and corrected. It should be noted that FIG. 4 shows a quantitative relational example in a case where L denotes the standard visual distance, the pupillary distance d is set as 65 mm, the screen sizes of the displayable area of the image display device are set as 700 inches, 100 inches, 70 inches, and 40 inches.

In step ST6, the disparity amount correction unit 4 corrects the binocular disparity amount D on the basis of the computation result obtained in step ST5 and the display device data Dd so that the dynamic range becomes corrected one. The disparity amount correction unit 4 combines the corrected dynamic range with the binocular disparity amount D to correct the original binocular disparity amount D detected in step ST3 (see FIGS. 5 and 6).

In step ST7, image data Dout after the correction is output. In the image display device used by the viewer III, the image data Dout after the correction is obtained by adjusting the binocular disparity amount D so that the pop-up amount and the pull-in amount intended by the image creator are represented. After that, in step ST8, the disparity amount correction unit 4 determines whether or not the disparity amount correction is ended. This determination is executed by determining whether the correction of the binocular disparity amount D in step ST6 is ended or not. In a case where the correction of the binocular disparity amount D is not ended, the flow is returned to step ST6. In a case where the correction of the binocular disparity amount D is ended, the binocular disparity image is output.

In this manner, with the three-dimensional image correction device 100 and the three-dimensional image correction method according to first embodiment, the correction computation unit 3 is provided which is configured to adjust the binocular disparity amount D detected by the disparity amount detection unit 2 on the basis of the display device data Dd to correct at least one of the dynamic ranges of the pop-up amount and the pull-in amount in the three-dimensional image. The binocular disparity amount D is corrected in the dynamic range after the correction while corresponding to the display device data Dd.

Therefore, the pop-up amount, the pull-in amount, and the like of the target object I can be adjusted while corresponding to the display device data Dd. Furthermore, even in a case where the specifications of the image display devices are varied, not only it is possible to realize the pop-up image and the depth image with at least one of the pop-up amount and the pull-in amount in the three-dimensional image preferred by the viewer, but also it is possible to accurately represent the pop-up image and the pull-in image intended by the image creator. As a result, it is possible to allow the viewer to perceive the three-dimensional image compliant with the intention of the creator.

According to the present embodiment, the case has been described in which step ST1 where the specification of the image display device is obtained is executed before step ST2 where the image data D in for the three-dimensional image but is not limited to the above. As the display device data Dd obtained step ST1 is used for the dynamic range correction computation in step ST5, step ST1 may be executed in any stage up to step ST4 after step ST2 as long as step ST1 is executed before step ST5.

Second Embodiment

Figure 8:
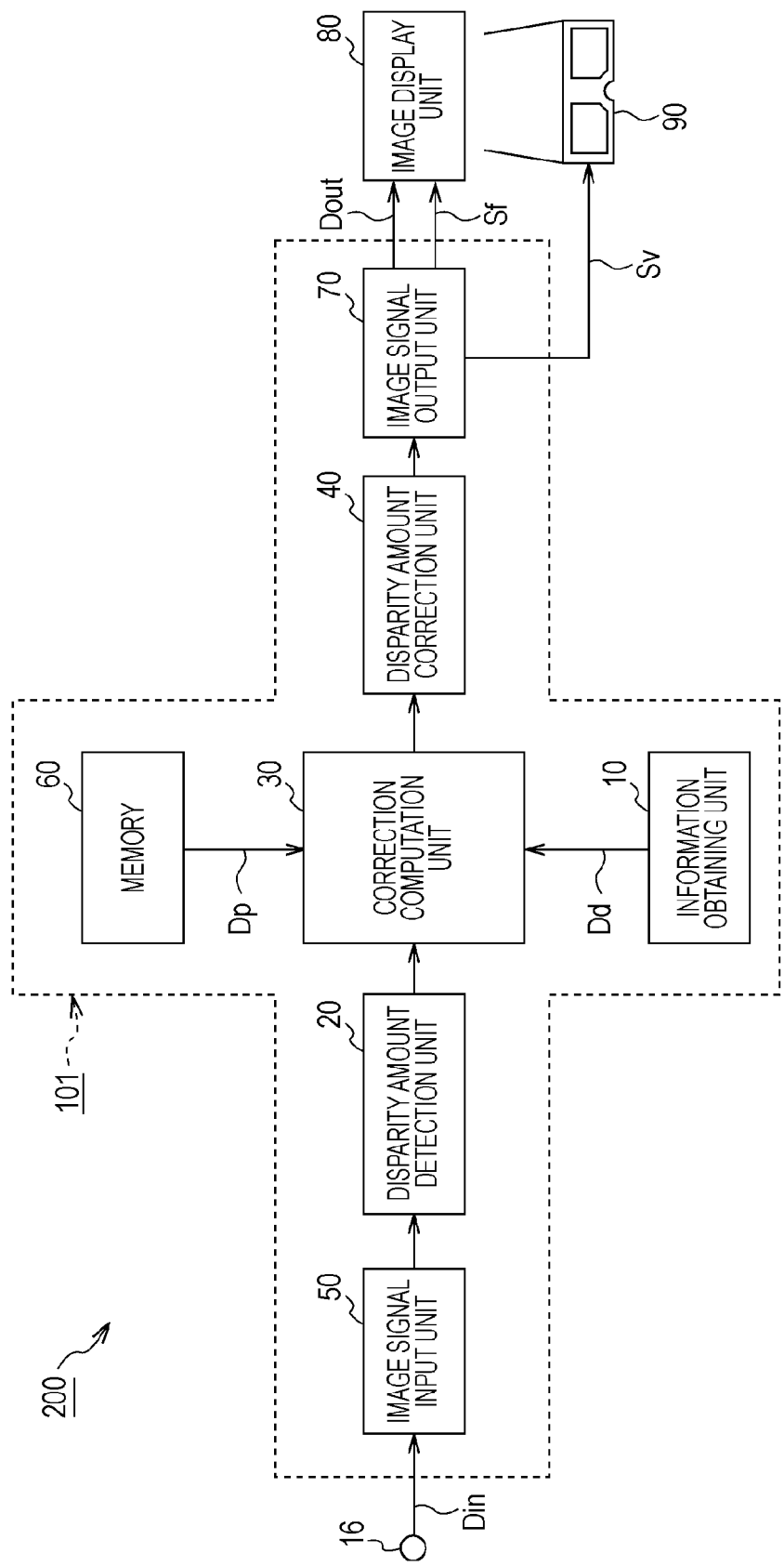
FIG. 8 is a block diagram showing a configuration example of a three-dimensional image display device according to a second embodiment of the present invention.

FIG. 8 is a block diagram showing a configuration example of a three-dimensional image display device 200 according to a second embodiment of the present invention. The three-dimensional image display device 200 shown in FIG. 8 is configured to display a video picture on the basis of the image data Dout for the three-dimensional image and is constructed by including an input terminal 16, a three-dimensional image correction unit 101, an image display unit 80, and liquid crystal shutter glasses 90.

The image data Din for the three-dimensional image composed of the image for the left eye and the image for the right eye is input to the input terminal 16. This image data Din is composed of a first two-dimensional image signal for displaying a two-dimensional video picture on the image display unit 80 and a second two-dimensional image signal for representing the depth with respect to the two-dimensional video picture. The three-dimensional image correction unit 101 is connected to the input terminal 16. At least one of the dynamic ranges of the pop-up amount and the pull-in amount in the three-dimensional image is corrected, and the binocular disparity amount D is corrected in the dynamic range after the correction while corresponding to the display device data Dd. For the three-dimensional image correction unit 101, the three-dimensional image correction device 100 described according to the first embodiment is applied.

The three-dimensional image correction unit 101 is constructed by including the information obtaining unit 10, the disparity amount detection unit 20, the correction computation unit 30, the disparity amount correction unit 40, an image signal input unit 50, a memory 60, and an image signal output unit 70. The image signal input unit 50 is connected to the above-mentioned input terminal 16 to input the image data Din for the three-dimensional image composed of the image for the left eye and the image for the right eye. The image data Din is supplied in a form of an electric signal or a form of an optical communication from an external three-dimensional image reproduction device, a digital broadcasting facility or the like to the image signal input unit 50 of the three-dimensional image display device 200.

The disparity amount detection unit 20 is connected to the image signal input unit 50. By inputting the image data Din for the three-dimensional image composed of the image for the left eye and the image for the right eye, the binocular disparity amount D is detected from the image data Din. The detection method for the binocular disparity amount is the same as described according to the first embodiment. The detection method for the binocular disparity amount D is not limited to a particular one. For the disparity amount detection unit 20, similarly as in the first embodiment, the DSP is used.

The correction computation unit 30 is connected to the disparity amount detection unit 20. The binocular disparity amount D detected by the disparity amount detection unit 20 is adjusted on the basis of the display device data Dd, and the correction information for correcting at least one of the dynamic ranges of the pop-up amount and the pull-in amount is computed (see FIGS. 2 and 3). For the correction computation unit 30, similarly as in the first embodiment, the CPU is used. In the correction computation unit 30, on the basis of the information on the image display unit 80 obtained by the information obtaining unit 10 and the binocular disparity amount D detected by the disparity amount detection unit 20, the computation is carried out for correcting at least one of the dynamic ranges of the pop-up amount and the pull-in amount of the target object I.

The disparity amount correction unit 40 is connected to the correction computation unit 30, and the binocular disparity amount D is corrected in the dynamic range corrected by the correction computation unit 30 while corresponding to the display device data Dd. The disparity amount correction unit 40 corrects, for example, the dynamic range on the basis of the correction information computed by the correction computation unit 30 to correct the binocular disparity amount D by combining the dynamic range after the correction and the detected binocular disparity amount D. In this example too, when the binocular disparity amount D on the display screen of the image display unit 80 is corrected, the disparity amount correction unit 40 sets at least one of the pop-up amount and the pull-in amount in the three-dimensional image in the dynamic range. The correction method for the binocular disparity amount D in the disparity amount correction unit 40 is the same as described with reference to FIGS. 5 to 7. For the disparity amount correction unit 40 too, the DSP is used.

In this example too, the information obtaining unit 10 is connected to the correction computation unit 30, and the display device data Dd for manually setting at least one of the dynamic ranges of the pop-up amount and the pull-in amount is input. In addition to the information obtaining unit 10, the memory 60 is connected to the correction computation unit 30, and the display device data Dd indicating the specification of the image display unit 80 is stored. In the memory 60, information related to the specification of the image display unit 80 used by the viewer III is stored. As long as this information includes information related to the screen size of the displayable area of the image display unit 80 and the displayable resolution, the EDID regulated by VESA may be used, or an original format may also be used. Also, the display device data Dd may also include information for identifying the display system of the image display unit 80 such as the liquid crystal display, the plasma display, or the organic EL display.

For the memory 60, similarly as in the first embodiment, other than the read-only memory (ROM) or the random access memory (RAM) in which information can be written or read as the occasion demands, the EEPROM or the non-volatile memory such as the hard disk is used. In the memory 60, in addition to the display device data Dd, the computer-readable system program is described. The system program is the same as described according to the first embodiment.

The image signal output unit 70 is connected to the above-mentioned disparity amount correction unit 40, and the image data Dout for the three-dimensional image after the disparity amount correction is output to the image display unit 80. The image data Dout is data for displaying the binocular disparity image whose binocular disparity amount D is corrected, and the data is output from the image signal output unit 70 to the image display unit 80. The image signal output unit 70 outputs, in addition to the image data Dout, the image display control signals Sf such as the horizontal synchronization signal and the vertical synchronization signal to the image display unit 80.

The image display unit 80 constituting one example of the display unit is connected to the image signal output unit 70 and displays the video picture for presenting the three-dimensional image on the basis of the image data Dout for presenting the three-dimensional image whose binocular disparity amount D is corrected and the image display control signal Sf. For example, on the basis of the image data Dout in the field sequential video picture format, the image display unit 80 alternately displays the left and right disparity images at timings in a time series manner such as the video picture for the left eye→the video picture for the right eye→the video picture for the left eye→the video picture for the right eye→ . . . on the display screen in a format which the viewer III can perceive. The correction method for the binocular disparity amount is the same as described according to the first embodiment. The liquid crystal display device, the plasma display device, the organic EL display device, or the like is used for the image display unit 80.

In addition to the image display unit 80, the liquid crystal shutter glasses 90 is connected to the image signal output unit 70, and on the basis of the vertical synchronization signal Sv in the image display control signal Sf, the shutter ON/OFF operations are repeatedly carried out alternately in such a manner that the left eye ON/the right eye OFF→the left eye OFF/the right eye ON→the left eye ON/the right eye OFF .... The shutter ON/OFF operations are executed in synchronism with the display switch between the displacement amount generated between the image for the left eye and the image for the right eye. With these configurations, only the video picture for the left eye is input to the left eye of the viewer, and only the video picture for the right eye is input to the right eye, so that it is possible to view the three-dimensional solid image.

Figure 9:
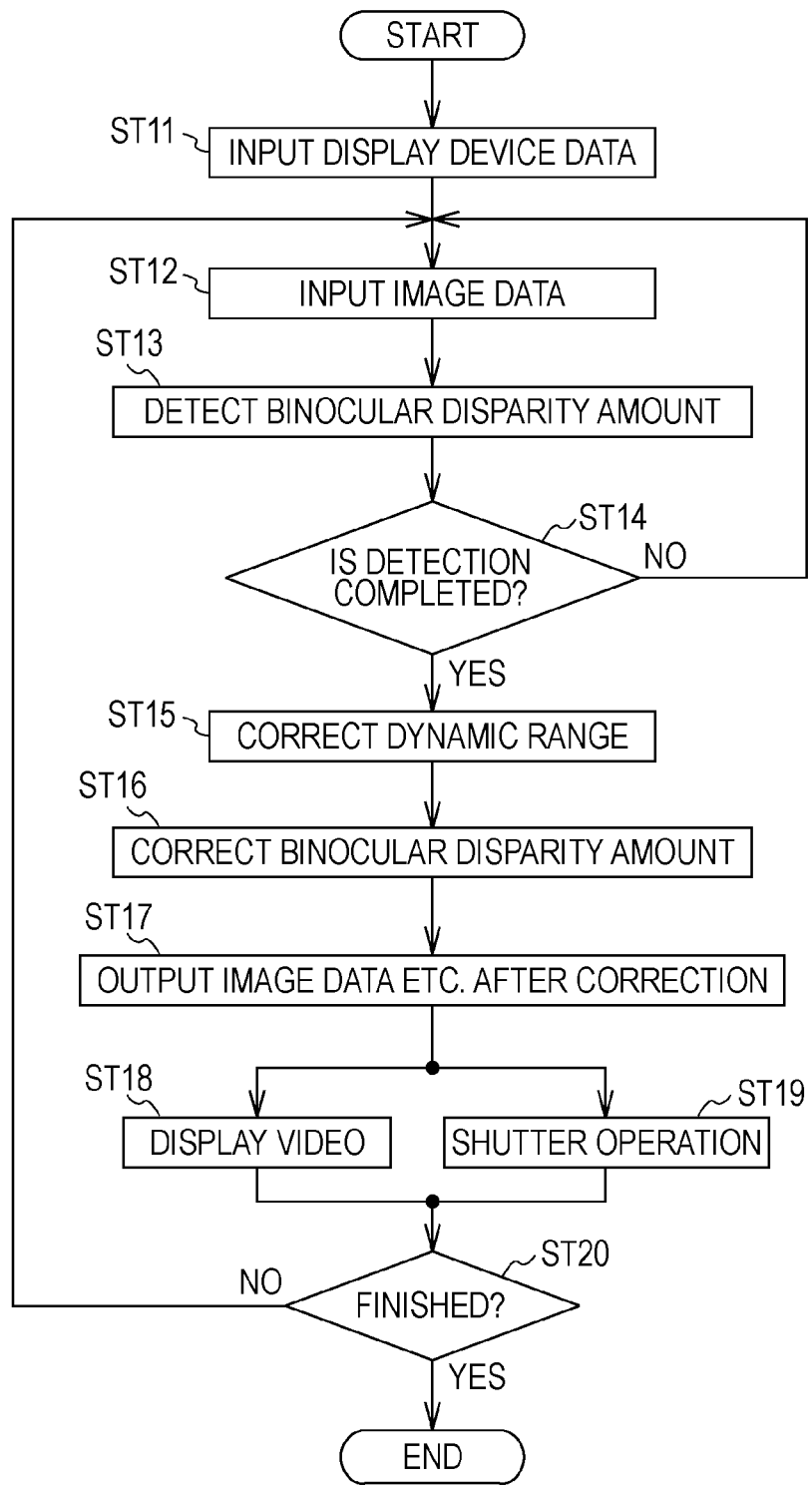
FIG. 9 is a flow chart showing an operational example of the three-dimensional image display device.

Subsequently, a description will be given of the operational example of the three-dimensional image display device 200. FIG. 9 is a flow chart showing an operational example of the three-dimensional image display device 200. According to the present embodiment, when a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to the eyes of the viewer, substantially approximated by (the pixel displacement amount)/(the standard visual distance) is set as a disparity amount, a width of a depth amount represented by the pop-up and the pull-in of the three-dimensional image is set as a dynamic range, and information related to a specification of a display device is set as display device information, information related to the specification of the image display unit 80 is set as display device data Dd. The display device data Dd includes information related to the screen size indicating the displayable area of the image display unit 80 and the resolution.

By setting these factors as the three-dimensional image display conditions, in the three-dimensional image display device 200, in step ST11 in the flow chart of FIG. 9, the information obtaining unit 10 obtains the specification of the pop-up amount, the pull-in amount, and the like of the target object through the image display unit 80 and inputs the display device data Dd. For example, the information obtaining unit 10 obtains information related to the screen size of the displayable area of the image display unit 80 viewed by the viewer III and the displayable resolution to be stored in the memory 60. With regard to the screen size, the information, and the like, the EDID regulated by VESA may be used, or an original format may also be used. The display device data Dd includes information for identifying a display method for the liquid crystal display, the plasma display, the organic EL display, and the like.

Next, the three-dimensional image display device 200 inputs, in step ST12, for example, the image data Din for the three-dimensional image in the field sequential video picture format composed of the image for the left eye and the image for the right eye. The image data Din is input via the input terminal 16 and the image signal input unit 50 to the disparity amount detection unit 20. After that, in step ST13, the disparity amount detection unit 20 detects the binocular disparity amount D from the image data Din. The detection method for the binocular disparity amount D is the same as described according to the first embodiment. The binocular disparity amount D added at this time point is set by the creator while supposing the image display unit 80 of a particular screen size, and in the image display unit 80 having a different screen size, the pop-up amount and the pull-in amount of the object are different from those intended by the creator.

In step ST14, the disparity amount detection unit 20 determines whether or not all the detections for the binocular disparity amount D are finished. In a case where all the detections for the binocular disparity amount D are not finished, and the flow is returned to step ST12 to repeatedly perform the above-mentioned processing. In a case where all the detections for the binocular disparity amount D are finished, the flow is shifted to step ST15.

In step ST15, the correction computation unit 30 adjusts the previously detected binocular disparity amount D on the basis of the display device data Dd to correct the dynamic range. For example, on the basis of the information and the like related to the screen size of the displayable area of the image display unit 80 obtained in step ST11 and the displayable resolution and the binocular disparity amount D detected in step ST13, the correction information for correcting at least one of the dynamic ranges of the pop-up amount and the pull-in amount is computed. The dynamic range is corrected on the basis of the correction information computed at this time.

In the computation for correcting the dynamic range, on the basis of the standard visual distance to the eyes of the viewer from the surface of the image display unit 80, the pupillary distance of the viewer, the binocular disparity amount D, the distance [m] to the target object perceived by the viewer which are obtained from the information and the like related to the screen size of the displayable area of the image display unit 80 and the displayable resolution, the expression (1) described in FIG. 2 and the expression (2) described in FIG. 3 are established. From these relational expressions, similarly as in the first embodiment, the correction computation unit 30 obtains the pop-up amount and the pull-in amount. When such relational expressions (1) and (2) are used, at least one of the dynamic ranges of the pop-up amount and the pull-in amount in the three-dimensional image can be continuously expanded and corrected.

After that, in step ST16, the disparity amount correction unit 40 corrects the binocular disparity amount D on the basis of the computation result obtained in step ST15 and the display device data Dd, so that the dynamic range becomes corrected one. The disparity amount correction unit 4 combines the corrected dynamic range with the binocular disparity amount D to correct the original binocular disparity amount D detected in step ST13 (see FIGS. 5 and 6).

In step ST17, the image signal output unit 70 outputs the image data Dout after the correction to the image display unit 80 and also outputs the vertical synchronization signal Sv to the liquid crystal shutter glasses 90. The image data Dout after the correction is obtained by adjusting the binocular disparity so that the pop-up amount and the pull-in amount intended by the image creator are represented in the image display unit 80 used by the viewer III.

In step ST18, on the basis of the image data Dout for presenting the three-dimensional image whose binocular disparity amount D is corrected and the image display control signal Sf, the image display unit 80 displays the video picture for presenting the three-dimensional image. In parallel to this, in step ST19, on the basis of the vertical synchronization signal Sv, the liquid crystal shutter glasses 90 repeatedly carries out the shutter ON/OFF operations alternately in such a manner that the left eye ON/the right eye OFF→the left eye OFF/the right eye ON→the left eye ON/the right eye OFF .... The shutter ON/OFF operations are executed in synchronism with the display switch between the displacement amount generated between the image for the left eye and the image for the right eye. With these configurations, only the video picture for the left eye is input to the left eye of the viewer, and only the video picture for the right eye is input to the right eye, so that it is possible to view the three-dimensional solid image.

After that, in step ST20, the three-dimensional image display device 200 determines whether the three-dimensional image display processing is to be finished or not. In this determination, for example, it is determined whether the three-dimensional image display processing is to be finished or not by detecting power source OFF information. In a case where the power source OFF information is not detected, and the flow is returned to step ST12 to repeatedly perform the above-mentioned processing. In a case where the power source OFF information is detected, the three-dimensional image display processing is finished.

In this manner, with the three-dimensional image display device 200 according to the second embodiment, as the three-dimensional image correction method according to the embodiment of the present invention is applied for the three-dimensional image correction unit 101, the pop-up amount, the pull-in amount, and the like of the target object can be adjusted while corresponding to the display device data Dd. Therefore, even in a case where the specification of the three-dimensional image display device 200 is different, not only it is possible to realize the pop-up amount, the pull-in amount, and the like preferred by the viewer, but also it is possible to accurately express the pop-up amount, the pull-in amount, and the like intended by the image creator. As a result, it is possible to allow the viewer to perceive the three-dimensional image compliant with the intention of the image creator. The viewer can sufficiently perceive the three-dimensional image compliant with the intention of the image creator.

Third Embodiment

Figure 10:
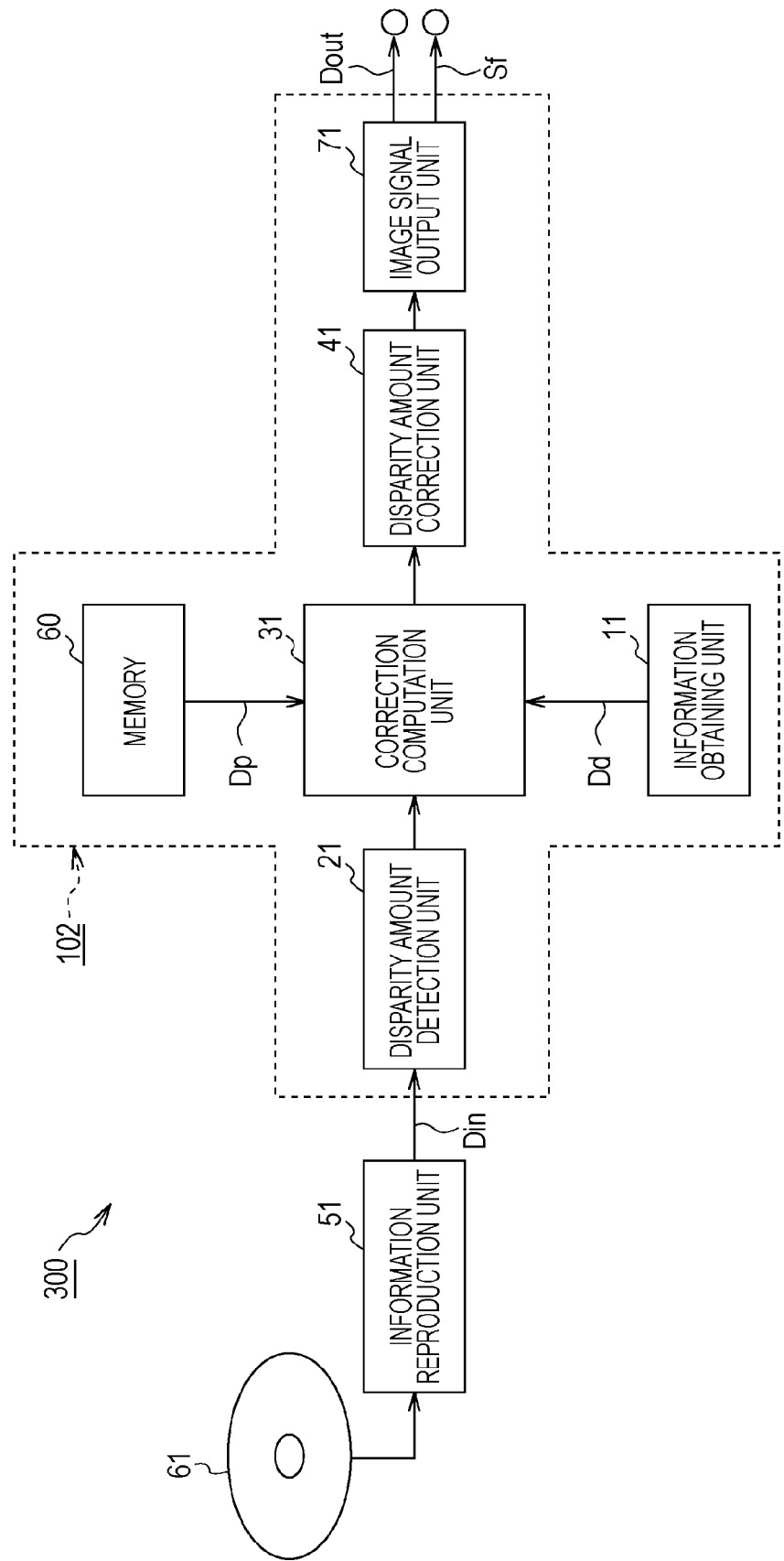
FIG. 10 is a block diagram showing a configuration example of a three-dimensional image reproduction device according to a third embodiment of the present invention.

FIG. 10 is a block diagram showing a configuration example of a three-dimensional image reproduction device 300 according to a third embodiment of the present invention. The three-dimensional image reproduction device 300 is constructed by including an information reproduction unit 51 and a three-dimensional image correction unit 102.

The information reproduction unit 51 constitutes an example of the reproduction unit and is configured to reproduce the image information for the three-dimensional image composed of the image for the left eye and the image for the right eye. Information recording medium such as Blu-ray (R) or a DVD is mounted to the information reproduction unit 51. On the information recording medium, the image data Din for the three-dimensional image is recorded. The image data Din is composed of a first two-dimensional image signal for displaying a two-dimensional video picture and a second two-dimensional image signal for representing the depth of the two-dimensional video picture on the image display device such as the liquid crystal display, the plasma display, or the organic EL display.

Although not shown, the information reproduction unit 51 includes an optical pickup, a spindle motor, a servo circuit, a spindle control circuit, a demodulation circuit, an error correction circuit, and the like to constitute a data reading circuit. The data reading circuit is provided with a stream separation unit and a decode unit, the video stream (hereinafter referred to as image data Din) and audio stream are separated. In the case where the information recording medium is the DVD, MPEG2 PS (program stream) is decoded. In the case where the information recording medium is Blu-ray, MPEG2 Video, MPEG4 AVC, and the like are decoded.

The three-dimensional image correction unit 102 is connected to the information reproduction unit 51. The binocular disparity amount D the image data Din reproduced by the information reproduction unit 51 is corrected, and the image data Dout for the three-dimensional image after the disparity amount correction is output. The image data Din is composed of the image for the left eye and the image for the right eye. The three-dimensional image correction unit 102 corrects at least one of the dynamic ranges of the pop-up amount and the pull-in amount in the three-dimensional image and also corrects the binocular disparity amount D on the basis of the display device data Dd so that the dynamic range becomes the corrected one. For the three-dimensional image correction unit 102, the three-dimensional image correction device 100 described according to the first embodiment is applied.

The three-dimensional image correction unit 102 is constructed by including the information obtaining unit 11, the disparity amount detection unit 21, the correction computation unit 31, the disparity amount correction unit 41, the image signal input unit 50, the memory 60, and an image signal output unit 71. The disparity amount detection unit 21 is connected to the above-mentioned information reproduction unit 51. By inputting the image data Din for the three-dimensional image composed of the image for the left eye and the image for the right eye, the binocular disparity amount D is detected from the image data Din. The detection method for the binocular disparity amount D is the same as described according to the first embodiment. The detection method for the binocular disparity amount D is not limited to a particular one. For the disparity amount detection unit 21, similarly as in the first embodiment, the DSP is used.

The correction computation unit 31 is connected to the disparity amount detection unit 21. The binocular disparity amount D detected by the disparity amount detection unit 21 is adjusted on the basis of the display device data Dd, and at least one of the dynamic ranges of the pop-up amount and the pull-in amount is corrected (see FIGS. 2 and 3). For the correction computation unit 31, similarly as in the first and second embodiments, the CPU is used. In the correction computation unit 31, on the basis of the information on the image display device which is obtained by the information obtaining unit 11 and the binocular disparity amount D detected by the disparity amount detection unit 21, the computation is carried out for correcting at least one of the dynamic ranges of the pop-up amount and the pull-in amount of the target object I.

The disparity amount correction unit 41 is connected to the correction computation unit 31. The disparity amount correction unit 41 corrects the binocular disparity amount D on the basis of the computation result in the correction computation unit 31 and the display device data Dd so that the dynamic range becomes corrected one. The disparity amount correction unit 41 corrects, for example, the dynamic range on the basis of the correction information computed by the correction computation unit 31 to correct the binocular disparity amount D by combining the dynamic range after the correction and the detected binocular disparity amount D. In this example too, in the disparity amount correction unit 41, the binocular disparity amount D on the display screen of the image display device is corrected, and at least one of the pop-up amount and the pull-in amount in the three-dimensional image is set in the dynamic range. The correction method for the binocular disparity amount in the disparity amount correction unit 41 is the same as described with reference to FIGS. 5 to 7. For the disparity amount correction unit 41 too, the DSP is used.

In this example too, the information obtaining unit 11 is connected to the correction computation unit 31, and the display device data Dd for manually setting at least one of the dynamic ranges of the pop-up amount and the pull-in amount is input. The memory 60 is also connected to the correction computation unit 31 in addition to the information obtaining unit 11. The memory 60 stores the display device data Dd indicating the specification of the image display device. In the memory 60, the information related to the specification of the image display device used by the viewer III is stored. As long as this information includes information related to the screen size of the displayable area of the image display device and the displayable resolution, the EDID regulated by VESA may be used, or an original format may also be used. Also, the display device data Dd may also include information for identifying a display method for the image display device such as the liquid crystal display, the plasma display, or the organic EL display.

For the memory 60, similarly as in the first and second embodiments, other than the ROM or the RAM, the non-volatile memory such as the EEPROM or the hard disk is used. In the memory 60, in addition to the display device data Dd, the computer-readable system program is described. The system program is the same as described according to the first embodiment.

The image signal output unit 71 is connected to the above-mentioned disparity amount correction unit 41, and the image data Dout for the three-dimensional image after the disparity amount correction is output to the image display device for the three-dimensional image display. The image data Dout is data for displaying the binocular disparity image whose binocular disparity amount D is corrected, and is output from the image signal output unit 71 to the image display device for displaying the three-dimensional image. The image signal output unit 71 outputs, in addition to the image data Dout, the image display control signals Sf such as the horizontal synchronization signal and the vertical synchronization signal to the image display device.

Figure 11:
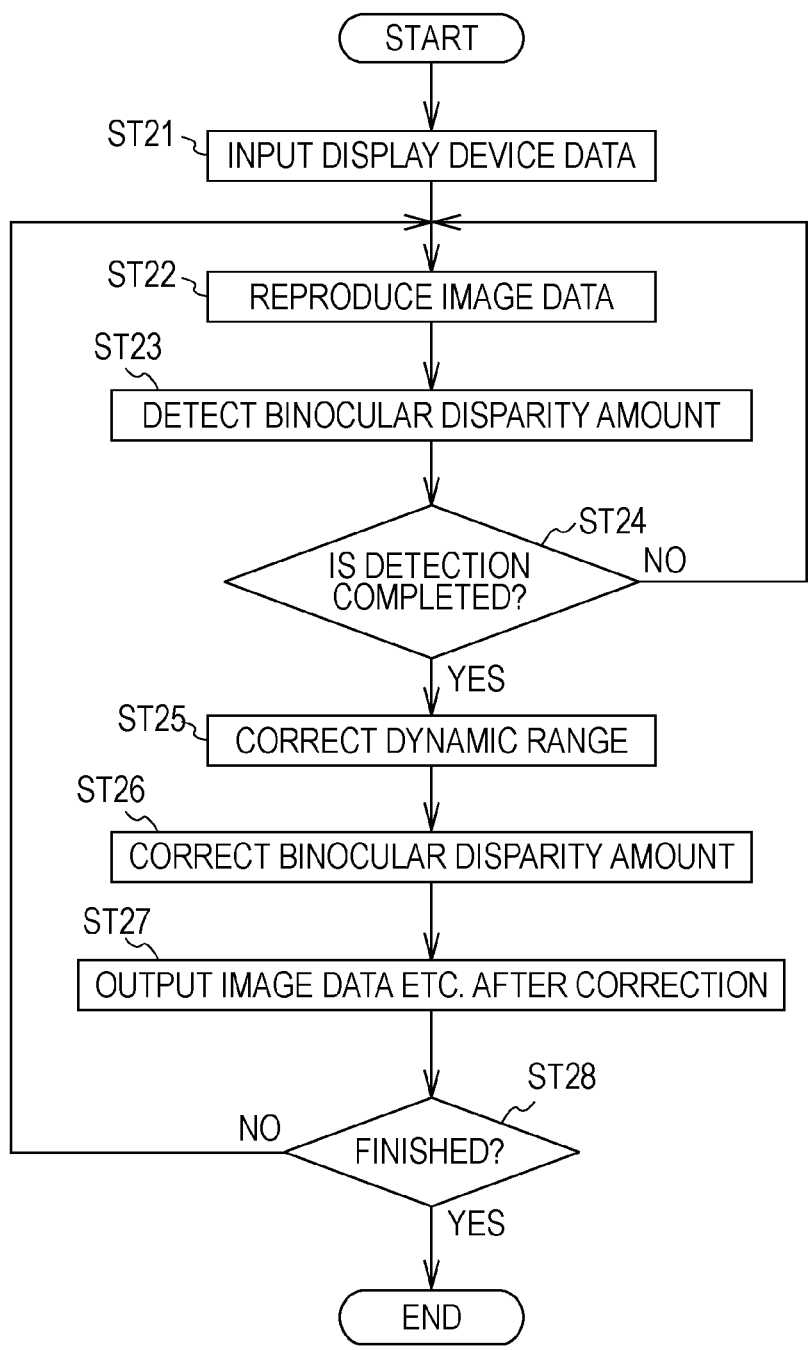
FIG. 11 is a flow chart showing an operational example of the three-dimensional image reproduction device.

Subsequently, a description will be given of the operational example of the three-dimensional image reproduction device 300. FIG. 11 is a flow chart showing an operational example of the three-dimensional image reproduction device 300. According to the present embodiment, the three-dimensional image reproduction device 300 is used by being connected to the image display device for displaying the three-dimensional image. The information reproduction unit 51 has the information recording medium such as the DVD mounted thereto. On the information recording medium, for example, the image data Din for the three-dimensional image in the field sequential video picture format composed of the image for the left eye and the image for the right eye is recorded. The image data Din is composed of a first two-dimensional image signal for displaying a two-dimensional video picture and a second two-dimensional image signal for representing the depth of the two-dimensional video picture on the image display device such as the liquid crystal display, the plasma display, or the organic EL display.

By setting this as the three-dimensional image reproduction condition, in the three-dimensional image reproduction device 300, in step ST21 in the flow chart of FIG. 11, the information obtaining unit 11 obtains the specification of the pop-up amount, the pull-in amount, and the like of the target object in the image display device and inputs the display device data Dd. For example, the information obtaining unit 11 stores the information related to the screen size of the displayable area of the image display device which the viewer attempts to view and the displayable resolution and stores the information in the memory 60. With regard to the screen size, the information, and the like, the EDID regulated by VESA may be used, or an original format may also be used. The display device data Dd may include information for identifying the display method for the liquid crystal display, the plasma display, the organic EL display, and the like.

Next, in the three-dimensional image reproduction device 300, in step ST22, the information reproduction unit 51 reproduces the image data Din for the three-dimensional image in the field sequential video picture format composed of the image for the left eye and the image for the right eye from an information recording medium 61. The image data Din after the reproduction is output to the disparity amount detection unit 21. After that, in step ST23, the disparity amount detection unit 21 detects the binocular disparity amount D from the image data Din. The detection method for the binocular disparity amount D is the same as described according to the first embodiment. The binocular disparity amount D added at this time point is set by the image creator while supposing the image display device having a particular screen size, and the pop-up amount and the pull-in amount of the object are different from those intended by the creator in the image display device having a different screen size.

In step ST24, the disparity amount detection unit 21 determines whether or not all the detections for the binocular disparity amount D are finished. In a case where all the detections for the binocular disparity amount D are not finished, and the flow is returned to step ST22 to repeatedly perform the above-mentioned processing. In a case where all the detections for the binocular disparity amount D are finished, the flow is shifted to step ST25.

In step ST25, the correction computation unit 31 adjusts the previously detected binocular disparity amount D on the basis of the display device data Dd to correct the dynamic range. For example, on the basis of the information related to the screen size of the displayable area of the image display device obtained in step ST21 and the displayable resolution and the binocular disparity amount D detected in step ST23, the correction information for correcting at least one of the dynamic ranges of the pop-up amount and the pull-in amount is computed.

In the computation for correcting the dynamic range, from the standard visual distance to the eyes of the viewer from the surface of the image display device, the pupillary distance of the viewer, the binocular disparity amount D, and the distance to the target object perceived by the viewer which can be obtained from the screen size of the displayable area, the information related to the displayable resolution, and the like, the expression (1) described in FIG. 2 and the expression (2) described in FIG. 3 are established. From these relational expressions, similarly as in the first embodiment, the correction computation unit 31 obtains the pop-up amount and the pull-in amount. When the correction information is obtained by using such relational expressions (1) and (2), at least one of the dynamic ranges of the pop-up amount and the pull-in amount in the three-dimensional image can be continuously expanded and corrected. The dynamic range is corrected on the basis of the correction information computed at this time.

After that, in step ST26, on the basis of the computation result obtained in step ST25 and the display device data Dd, the disparity amount correction unit 41 corrects the binocular disparity amount D so that the dynamic range becomes the corrected one. The disparity amount correction unit 4 combines the corrected dynamic range with the binocular disparity amount D to correct the original binocular disparity amount D detected in step ST23 (see FIGS. 5 and 6).

In step ST27, the image signal output unit 71 outputs the image data Dout after the correction to the image display device and also outputs the image display control signal Sf to an image forming device. In the image display device used by the viewer III, the image data Dout after the correction is obtained by adjusting the binocular disparity amount D so that the pop-up amount and the pull-in amount intended by the image creator are represented. As a result, in the image display device, it is possible to view the three-dimensional image solid video picture.

After that, in step ST28, the three-dimensional image reproduction device 300 determines whether or not the three-dimensional image reproduction processing is to be finished. In this determination, for example, it is determined whether the three-dimensional image reproduction processing is to be finished or not by detecting the power source OFF information. In a case where the power source OFF information is not detected, and the flow is returned to step ST22 to repeatedly perform the above-mentioned processing. In a case where the power source OFF information is detected, the three-dimensional image reproduction processing is ended.

In this manner, with the three-dimensional image reproduction device 300 according to the third embodiment, as the three-dimensional image correction device 100 according to the embodiment of the present invention is applied to the three-dimensional image correction unit 102, the pop-up amount, the pull-in amount, and the like of the target object can be adjusted while corresponding to the display device data Dd. Therefore, even in a case where the specifications of the three-dimensional image display devices are varied, not only it is possible to realize the pop-up amount, the pull-in amount, and the like preferred by the viewer, but also it is possible to accurately express the pop-up amount, the pull-in amount, and the like intended by the image creator. As a result, it is possible to allow the viewer to perceive the three-dimensional image compliant with the intention of the creator.

Fourth Embodiment

Figure 12:
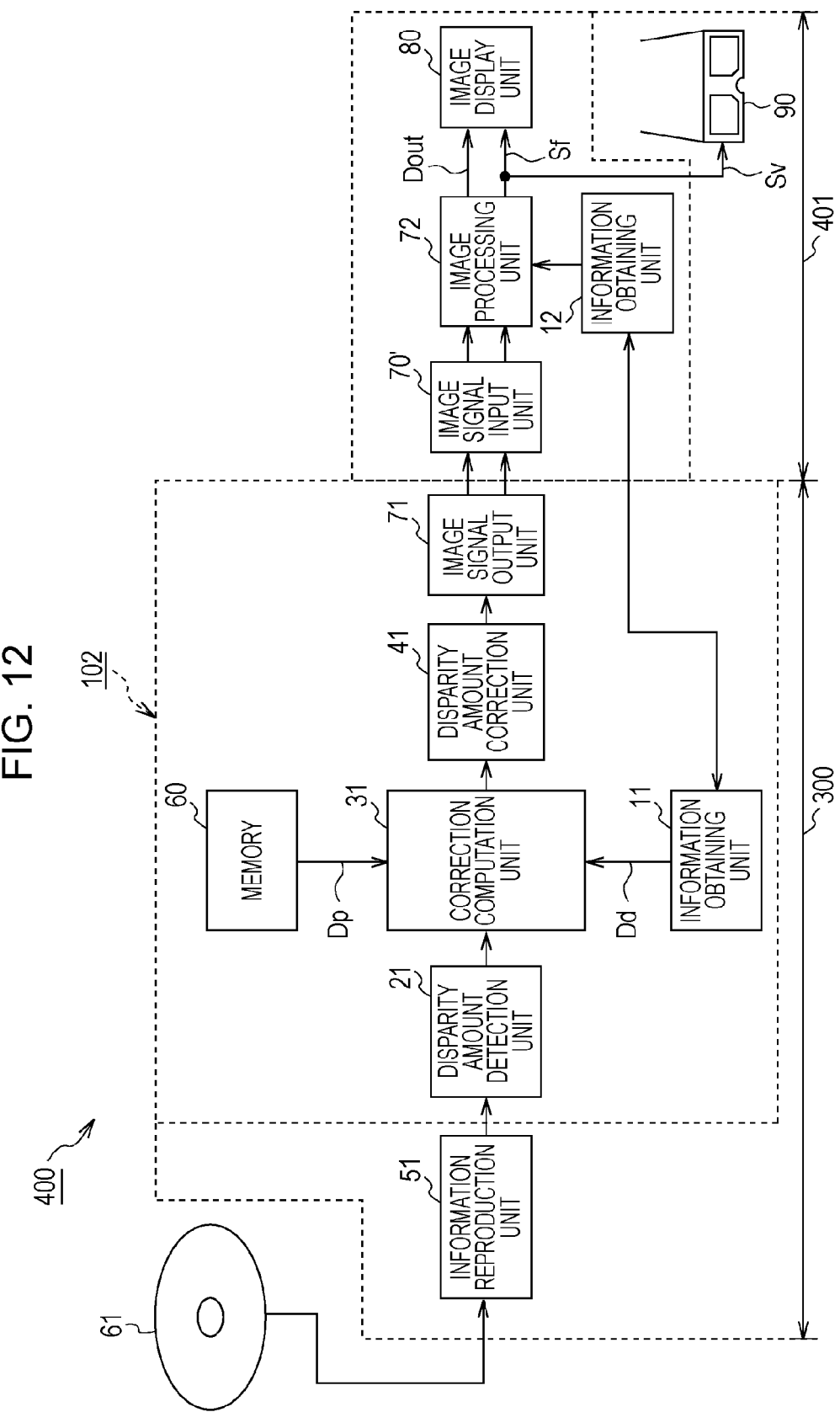
FIG. 12 is a block diagram showing a configuration example of a three-dimensional image provision system according to a fourth embodiment of the present invention.

FIG. 12 is a block diagram showing a configuration example of a three-dimensional image provision system 400 according to a fourth embodiment of the present invention. According to the present embodiment, the three-dimensional image reproduction device 300 having a three-dimensional image correction function and a three-dimensional image display device 401 which is not provided with the three-dimensional image correction function are combined to construct the three-dimensional image provision system 400.

The first three-dimensional image provision system 400 shown in FIG. 12 is constructed by including the three-dimensional image reproduction device 300 which reproduces the image data Din for the three-dimensional image composed of the image for the left eye and the image for the right eye from the predetermined information recording medium 61, the three-dimensional image display device 401 which inputs the image data Din for the three-dimensional image reproduced by the three-dimensional image reproduction device 300 to display the video picture, and the liquid crystal shutter glasses 90. The image data Din for the three-dimensional image is composed of the first two-dimensional image signal for displaying the two-dimensional video picture on the three-dimensional image display device 401 and the second two-dimensional image signal for representing the depth of the two-dimensional video picture.

As described according to the third embodiment, the three-dimensional image reproduction device 300 has the three-dimensional image correction unit 102, and the image information for the three-dimensional image after the disparity amount correction is output to the three-dimensional image display device 401. When a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to the eyes of the viewer, substantially approximated by (the pixel displacement amount)/(the standard visual distance) is set as a disparity amount, a width of a depth amount represented by the pop-up and the pull-in of the three-dimensional image is set as the dynamic range, the information related to the specification of the three-dimensional image display device 401 is set as the display device data Dd, the three-dimensional image correction unit 102 includes the disparity amount detection unit 21, the correction computation unit 31, and the disparity amount correction unit 41.

The disparity amount detection unit 21 inputs the image data Din for the three-dimensional image composed of the image for the left eye and the image for the right eye to detect the binocular disparity amount D from the image data Din. The correction computation unit 31 adjusts the disparity amount detected by the disparity amount detection unit 21 on the basis of the display device data Dd to correct the dynamic range. The disparity amount correction unit 41 corrects the binocular disparity amount D in the dynamic range corrected by the correction computation unit 31 while corresponding to the display device data Dd.

The image signal output unit 71 is connected to the disparity amount correction unit 41, and the image data Dout for the three-dimensional image after the disparity amount correction is output to the three-dimensional image display device 401. The image data Dout is data for displaying the binocular disparity image whose binocular disparity amount D is corrected and output from the image signal output unit 71 to the three-dimensional image display device 401. The image signal output unit 71 outputs, in addition to the image data Dout, the image display control signals Sf such as the horizontal synchronization signal and the vertical synchronization signal to the three-dimensional image display device 401.

The three-dimensional image display device 401 is constructed by including the information obtaining unit 12, an image signal input unit 70', an image processing unit 72, and the image display unit 80. In this example, the image signal output unit 71 of the three-dimensional image reproduction device 300 and the image signal input unit 70' of the three-dimensional image display device 401 are connected with each other, the information obtaining unit 11 and the information obtaining unit 12 are connected by an HDMI cable in conformity to the HDMI standard.

In the HDMI standard, in addition to a TMDS signal for transmitting a video picture signal, a signal called DDC (Display Data Channel) is assigned. With the DDC, a communication is carried out between a source device configured to send the video picture signal and a sink device configured to receive the video picture signal. The source device can read out register information called EDID of the sink device via the DDC. In other words, the three-dimensional image reproduction device 300 and the three-dimensional image display device 401 are connected by the HDMI cable not shown in the drawing, it is possible to read out the information on the three-dimensional image display device 401 side from the three-dimensional image reproduction device 300 side.

The image processing unit 72 is connected to the image signal input unit 70', and on the basis of the image data Dout and the image display control signal Sf, the video picture signal in a format requested by the image display unit 80 is created. In this example, the information obtaining unit 12 is connected to the image processing unit 72, and the display device data Dd for manually setting at least one of the dynamic ranges of the pop-up amount and the pull-in amount is input. As being different from the second embodiment, in the three-dimensional image display device 401, the image processing unit 72 does not have the three-dimensional image correction function. Thus, the display device data Dd is transferred to the information obtaining unit 11 of the three-dimensional image reproduction device 300 via the HDMI cable.

The memory 60 of the three-dimensional image reproduction device 300 stores the display device data Dd indicating the specification of the three-dimensional image display device 401 received from the three-dimensional image display device 401. The display device data Dd includes information related to the screen size of the displayable area of the three-dimensional image display device 401 and the displayable resolution. With regard to the display device data Dd, the EDID regulated by VESA may be used, or an original format may also be used. Also, the display device data Dd may include information for identifying a display method for the three-dimensional image display device 401 such as the liquid crystal display, the plasma display, or the organic EL display.

The image display unit 80 is connected to the above-mentioned image processing unit 72, and on the basis of the image data Dout for presenting the three-dimensional image whose binocular disparity amount D is corrected and the image display control signal Sf, the video picture for presenting the three-dimensional image. For example, the image display unit 80 alternately displays the left and right disparity images at timings in a time series manner such as the video picture for the left eye→the video picture for the right eye→the video picture for the left eye→the video picture for the right eye→ . . . on the display screen in a format which the viewer III can perceive on the basis of the image data Dout in the predetermined video picture format. The correction method for the binocular disparity amount is the same as described according to the first embodiment. The liquid crystal display device, the plasma display device, the organic EL display device, or the like is used for the image display unit 80. It should be noted that components having the same names and reference symbols as those according to the third embodiment have the same functions, and a description thereof will be omitted.

Figure 13:
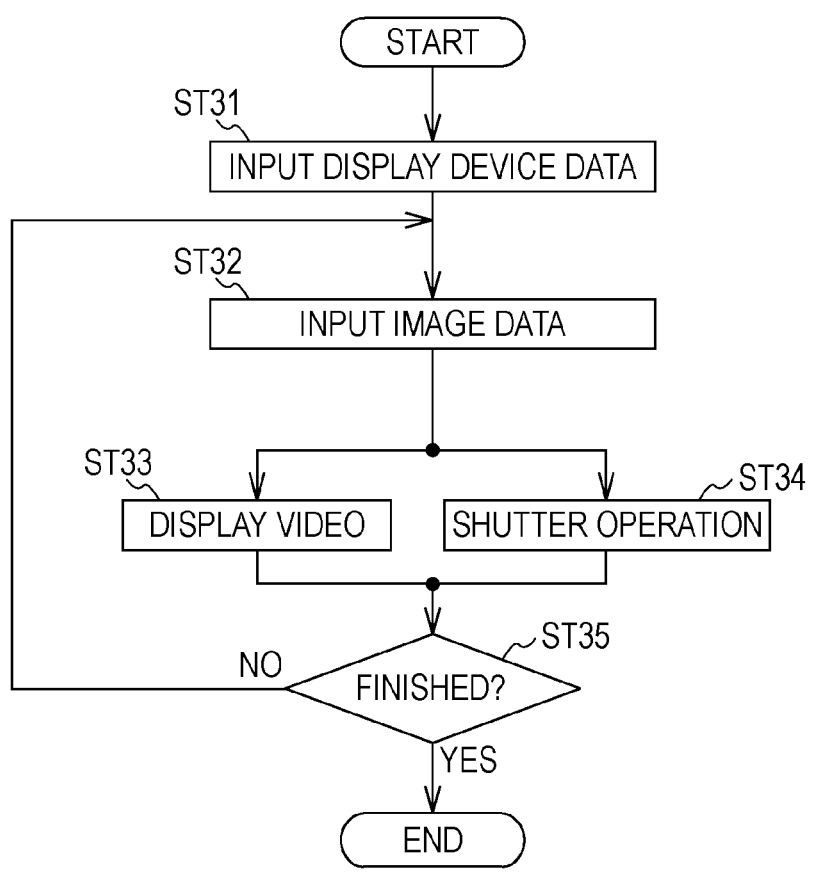
FIG. 13 is a flow chart showing an operational example of the three-dimensional image display device.

Subsequently, a description will be given of an operation example of the three-dimensional image provision system 400. FIG. 13 is a flow chart showing an operational example of the three-dimensional image display device 401. It should be noted that the operational example of the three-dimensional image reproduction device 300 has been already described with reference to FIG. 11, and a description thereof will be omitted.

In the three-dimensional image display device 401, in step ST31 in the flow chart of FIG. 13, the information obtaining unit 12 obtains the specification of the pop-up amount, the pull-in amount, and the like of the target object and inputs the display device data Dd whose execution is requested by the image display unit 80. For example, the information obtaining unit 12 obtains the information related to the screen size of the displayable area of the image display unit 80 viewed by the viewer III and the displayable resolution to be transferred to the three-dimensional image reproduction device 300 and stored in the memory 60. With regard to the screen size, the information, and the like, the EDID regulated by VESA may be used, or an original format may also be used. The display device data Dd may include information for identifying the display method for the liquid crystal display, the plasma display, the organic EL display, and the like.

Next, in step ST32, the three-dimensional image display device 401 inputs the image data Din for the three-dimensional image in the field sequential video picture format composed of the image for the left eye and the image for the right eye from the three-dimensional image reproduction device 300, for example. The image data Din is input via the image signal input unit 50 to the image processing unit 72.

In step ST33, the image processing unit 72 outputs the image data Dout corrected by the three-dimensional image display device 401 to the image display unit 80 and also outputs the vertical synchronization signal Sv to the liquid crystal shutter glasses 90. The image data Dout after the correction is obtained by adjusting the binocular disparity so that the pop-up amount and the pull-in amount intended by the image creator are represented in the image display unit 80 used by the viewer III.

After that, in step ST34, on the basis of the image data Dout for presenting the three-dimensional image whose binocular disparity amount D is corrected and the image display control signal Sf, the image display unit 80 displays the video picture for presenting the three-dimensional image. In parallel to this, in step ST34, the liquid crystal shutter glasses 90 on the basis of the vertical synchronization signal Sv, the liquid crystal shutter glasses 90 repeatedly carries out the shutter ON/OFF operations alternately in such a manner that the left eye ON/the right eye OFF→the left eye OFF/the right eye ON→the left eye ON/the right eye OFF . . . . The shutter ON/OFF operations are executed in synchronism with the display switch between the displacement amount generated between the image for the left eye and the image for the right eye. With these configurations, only the video picture for the left eye is input to the left eye of the viewer, and only the video picture for the right eye is input to the right eye, so that it is possible to view the three-dimensional solid image.

After that, in step ST35, the three-dimensional image display device 401 determines whether the three-dimensional image display processing is to be finished or not. In this determination, for example, it is determined whether the three-dimensional image display processing is to be finished or not by detecting the power source OFF information. In a case where the power source OFF information is not detected, and the flow is returned to step ST32 to repeatedly perform the above-mentioned processing. In a case where the power source OFF information is detected, the three-dimensional image display processing is finished.

In this manner, with the three-dimensional image provision system 400 according to the fourth embodiment, the three-dimensional image reproduction device 300 according to the embodiment of the present invention is applied. Thus, on the three-dimensional image reproduction device 300 side, the pop-up amount, the pull-in amount, and the like of the target object can be adjusted while corresponding to the display device data Dd. Therefore, even in a case where the specification is different like the three-dimensional image display device 401 or the like, not only it is possible to realize the pop-up amount, the pull-in amount, and the like preferred by the viewer, but also it is possible to accurately express the pop-up amount, the pull-in amount, and the like intended by the image creator. As a result, it is possible to allow the viewer to perceive the three-dimensional image compliant with the intention of the creator.

Fifth Embodiment

Figure 14:
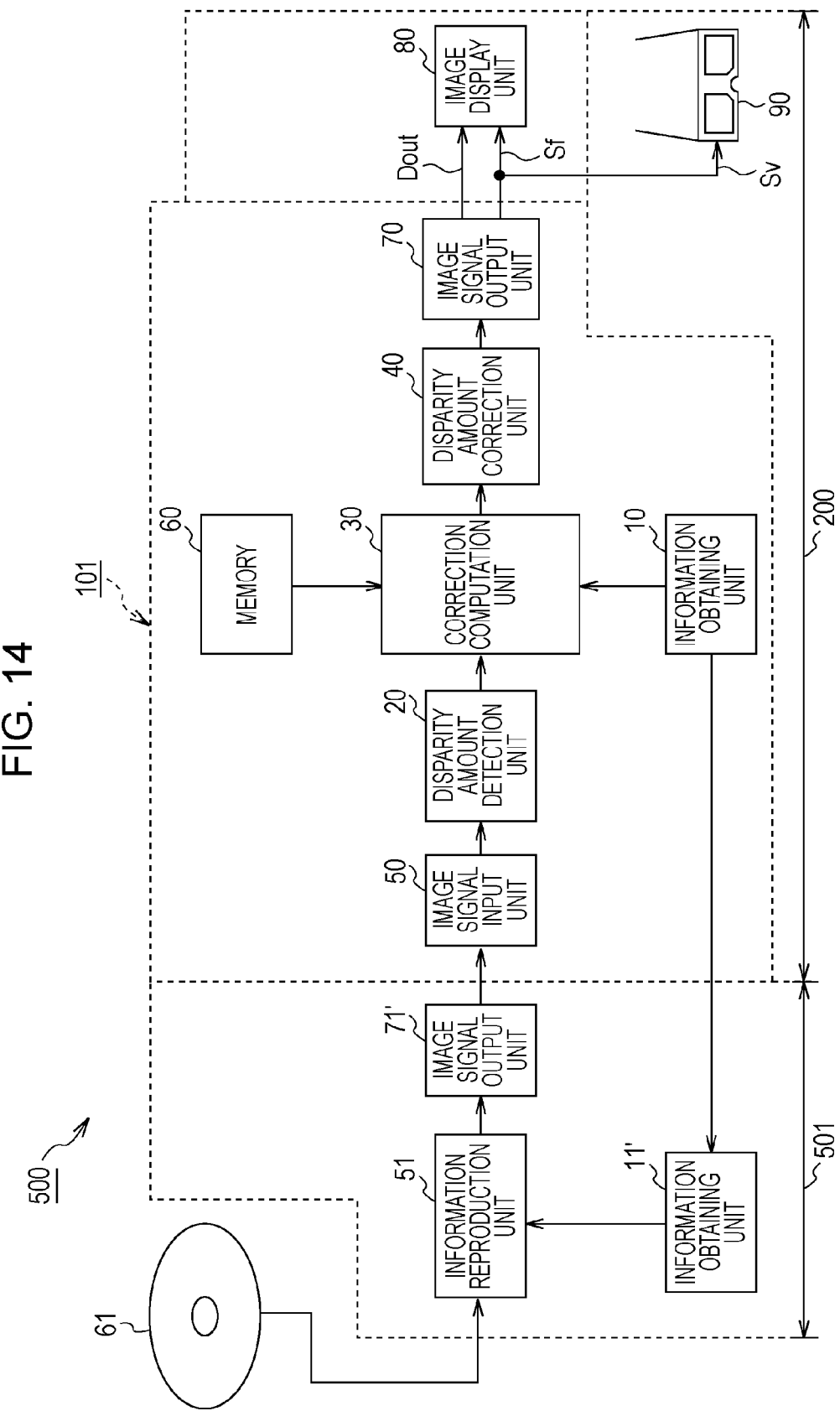
FIG. 14 is a block diagram showing a configuration example of a three-dimensional image provision system according to a fifth embodiment of the present invention.

FIG. 14 is a block diagram showing a configuration example of a three-dimensional image provision system 500 according to a fifth embodiment of the present invention. According to the present embodiment, the three-dimensional image display device 200 having the three-dimensional image correction function and a three-dimensional image reproduction device 501 which is not provided with the three-dimensional image correction function are combined with each other to constitute the three-dimensional image provision system 500.

The second three-dimensional image provision system 500 shown in FIG. 14 is constructed by including the liquid crystal shutter glasses 90, the three-dimensional image display device 200, and the three-dimensional image reproduction device 501. The three-dimensional image display device 200 inputs the image data Din for the three-dimensional image reproduced by the three-dimensional image reproduction device 501 to display a video picture.

The three-dimensional image reproduction device 501 is constructed by including the information obtaining unit 11', the information reproduction unit 51, and the image signal output unit 71'. The three-dimensional image reproduction device 501 is operated so as to reproduce the image data Din for the three-dimensional image composed of the image for the left eye and the image for the right eye from the particular information recording medium 61. The three-dimensional image reproduction device 501 does not have the three-dimensional image correction unit 102 as described according to the third embodiment.

The information recording medium 61 such as Blu-ray (R) or the DVD is the information reproduction unit 51. On the information recording medium 61, the image data Din for the three-dimensional image is recorded. The image data Din is composed of the first two-dimensional image signal for displaying the two-dimensional video picture and the second two-dimensional image signal for representing the depth of the two-dimensional video picture on the three-dimensional image display device 200 or the like such as the liquid crystal display, the plasma display, or the organic EL display. Although not shown, the information reproduction unit 51 includes the optical pickup, the spindle motor, the servo circuit, the spindle control circuit, the demodulation circuit, the error correction circuit, and the like to constitute the data reading circuit. The data reading circuit is provided with a stream separation unit and a decode unit, and the video stream and the audio stream are separated. The image signal output unit 71' is connected to the information reproduction unit 51 and outputs the image data Din for the three-dimensional image whose binocular disparity amount D is not corrected to the three-dimensional image display device 200.

In this example too, the image signal output unit 71' of the three-dimensional image reproduction device 501 and the image signal input unit 50 of the three-dimensional image display device 200 are connected with each other, and also the information obtaining unit 11' and the information obtaining unit 10 are connected by the HDMI cable in conformity to the HDMI standard.

The three-dimensional image display device 200 is constructed by including the image display unit 80, the liquid crystal shutter glasses 90, and the three-dimensional image correction unit 101. The three-dimensional image correction unit 101 includes the information obtaining unit 10, the disparity amount detection unit 20, the correction computation unit 30, the disparity amount correction unit 40, the image signal input unit 50, and the memory 60.

The disparity amount detection unit 20 is connected to the above-mentioned image signal input unit 50. The disparity amount detection unit 20 inputs the image data Din for the three-dimensional image composed of the image for the left eye and the image for the right eye to detect the binocular disparity amount D from the image data Din. the correction computation unit 30 adjusts the disparity amount detected by the disparity amount detection unit 20 on the basis of the display device data Dd to correct the dynamic range. The disparity amount correction unit 40 corrects the binocular disparity amount D in the dynamic range corrected by the correction computation unit 30 while corresponding to the display device data Dd.

The image signal output unit 70 is connected to the disparity amount correction unit 40, and the image data Dout for the three-dimensional image after the disparity amount correction is output to the image display unit 80. The image data Dout is data for displaying the binocular disparity image whose binocular disparity amount D is corrected, and is output from the image signal output unit 70 to the image display unit 80. The image signal output unit 70 outputs, in addition to the image data Dout, the image display control signals Sf such as the horizontal synchronization signal and the vertical synchronization signal to the image display unit 80.

In this example, the information obtaining unit 10 is connected to the correction computation unit 30, and the display device data Dd for manually setting at least one of the dynamic ranges of the pop-up amount and the pull-in amount is input. The three-dimensional image display device 200 transfers the display device data Dd such as the reproduction start or the reproduction stop via the HDMI to the information obtaining unit 11' of the three-dimensional image reproduction device 501.

The memory 60 of the three-dimensional image display device 200 stores the display device data Dd indicating the specification of the three-dimensional image display device 200 which is transferred from the information obtaining unit 10. The display device data Dd includes information related to the screen size of the displayable area of the image display unit 80 and the displayable resolution. With regard to the display device data Dd, the EDID regulated by VESA may be used, or an original format may also be used. Also, the display device data Dd may include information for identifying a display method for the image display unit 80 such as the liquid crystal display, the plasma display, or the organic EL display.

The image display unit 80 is connected to the above-mentioned image signal output unit 70, and on the basis of the image data Dout for presenting the three-dimensional image whose binocular disparity amount D is corrected and the image display control signal Sf, the video picture for presenting the three-dimensional image is displayed. For example, alternately displays the left and right disparity images at timings in a time series manner such as the video picture for the left eye→the video picture for the right eye→the video picture for the left eye→the video picture for the right eye→ . . . on the display screen in a format which the viewer III can perceive on the basis of the image data Dout in the predetermined video picture format. The correction method for the binocular disparity amount is the same as described according to the first embodiment. The liquid crystal display device, the plasma display device, the organic EL display device, or the like is used for the image display unit 80. It should be noted that components having the same names and reference symbols as those according to the second embodiment have the same functions, and a description thereof will be omitted.

Figure 15:
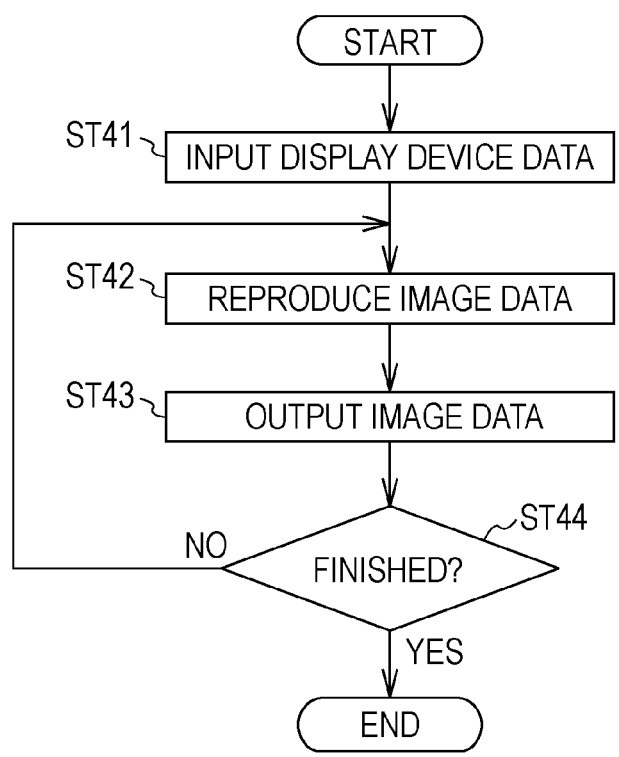
FIG. 15 is a flow chart showing an operational example of the three-dimensional image reproduction device 501.

Subsequently, a description will be given of an operation example of the three-dimensional image provision system 500. FIG. 15 is a flow chart showing an operational example of the three-dimensional image reproduction device 501. It should be noted that the operational example of the three-dimensional image display device 200 has been already described with reference to FIG. 9, and a description thereof will be omitted.

In the three-dimensional image reproduction device 501, in step ST41 in the flow chart shown in FIG. 15, the information obtaining unit 11 obtains the specification of the pop-up amount, the pull-in amount, and the like of the target object in the image display device and inputs the display device data Dd. For example, the information obtaining unit 11 stores the information related to the screen size of the displayable area of the image display device which the viewer attempts to view and the displayable resolution and stores the information in the memory 60. With regard to the screen size, the information, and the like, the EDID regulated by VESA may be used, or an original format may also be used. The display device data Dd may include information for identifying the display method for the liquid crystal display, the plasma display, the organic EL display, and the like.

Next, in the three-dimensional image reproduction device 300, in step ST42, the information reproduction unit 51 reproduces the image data Din for the three-dimensional image in the field sequential video picture format composed of the image for the left eye and the image for the right eye from the information recording medium 61. The image data Din after the reproduction is output in step ST43 from the image signal output unit 71' to the three-dimensional image display device 200.

After that, in step ST44, the three-dimensional image reproduction device 501 determines whether or not the three-dimensional image reproduction processing is to be finished. In this determination, for example, it is determined whether the three-dimensional image reproduction processing is to be finished or not by detecting reproduction OFF information. The reproduction OFF information is transferred as the display device data Dd from the three-dimensional image display device 200. In a case where the reproduction OFF information is not detected, and the flow is returned to step ST42 to repeatedly perform the above-mentioned processing. In a case where the reproduction OFF information is detected, the three-dimensional image reproduction processing is finished.

In this manner, with the three-dimensional image provision system 500 according to the fifth embodiment, as the three-dimensional image display device 200 according to the embodiment of the present invention is applied, on the three-dimensional image display device 200 side, the pop-up amount, the pull-in amount, and the like of the target object can be adjusted while corresponding to the display device data Dd. Therefore, even in a case where the specification is different like the three-dimensional image display device 401 or the like, not only it is possible to realize the pop-up amount, the pull-in amount, and the like preferred by the viewer, but also it is possible to accurately express the pop-up amount, the pull-in amount, and the like intended by the image creator. As a result, it is possible to allow the viewer to perceive the three-dimensional image compliant with the intention of the image creator. In this manner, in a case where the three-dimensional image provision systems 400 and 500 and the like are constructed, if the three-dimensional image correction function is provided to any one of the three-dimensional image display device 200 and the three-dimensional image reproduction device 300, remarkable effects according to the embodiment of the present invention can be obtained.

Figure 16:
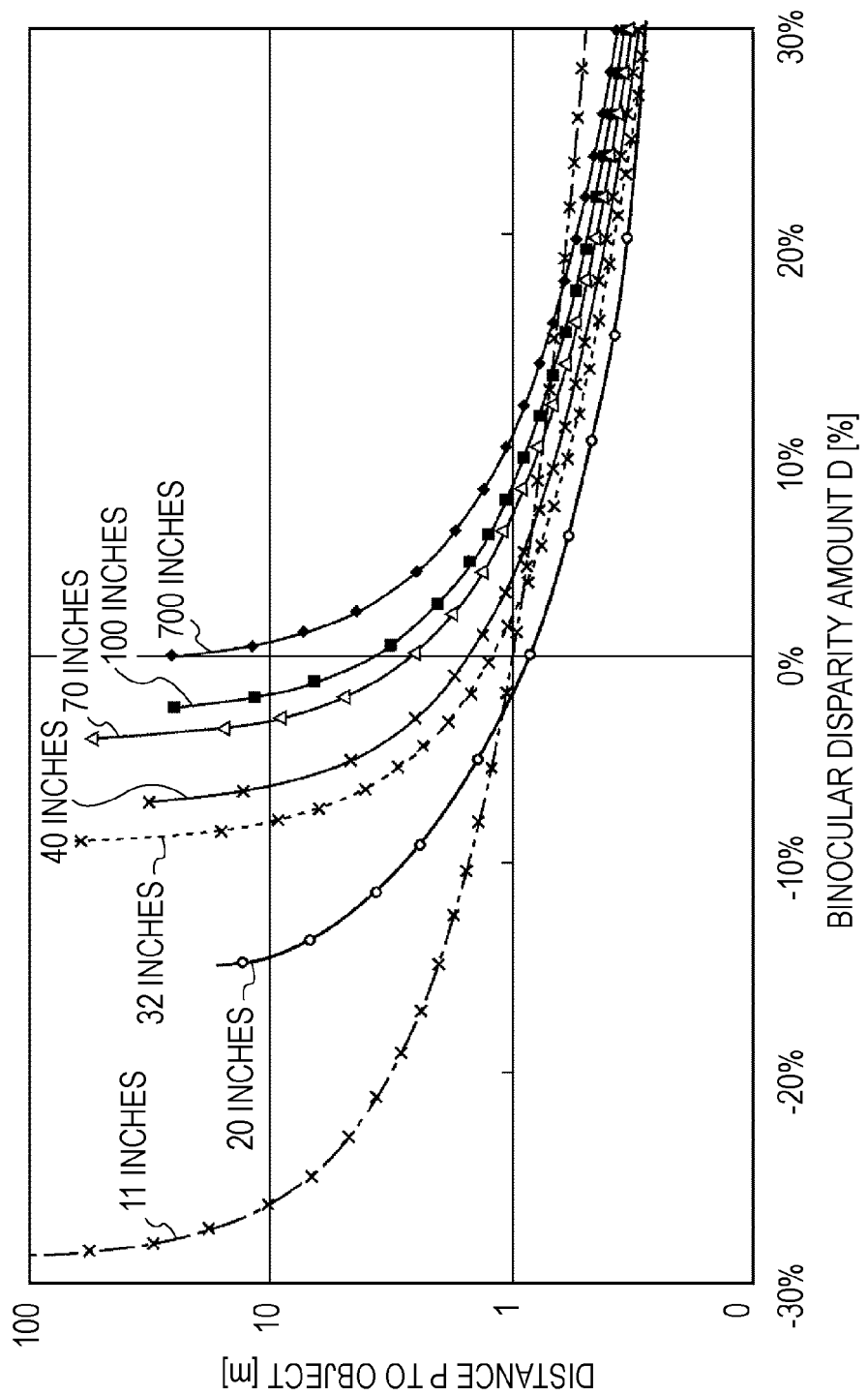
FIG. 16 is a graph chart showing a quantitative relational example between the % binocular disparity amount and the pop-up amount and the pull-in amount of the target object in the respective image display devices (seven types)
Figure 21:
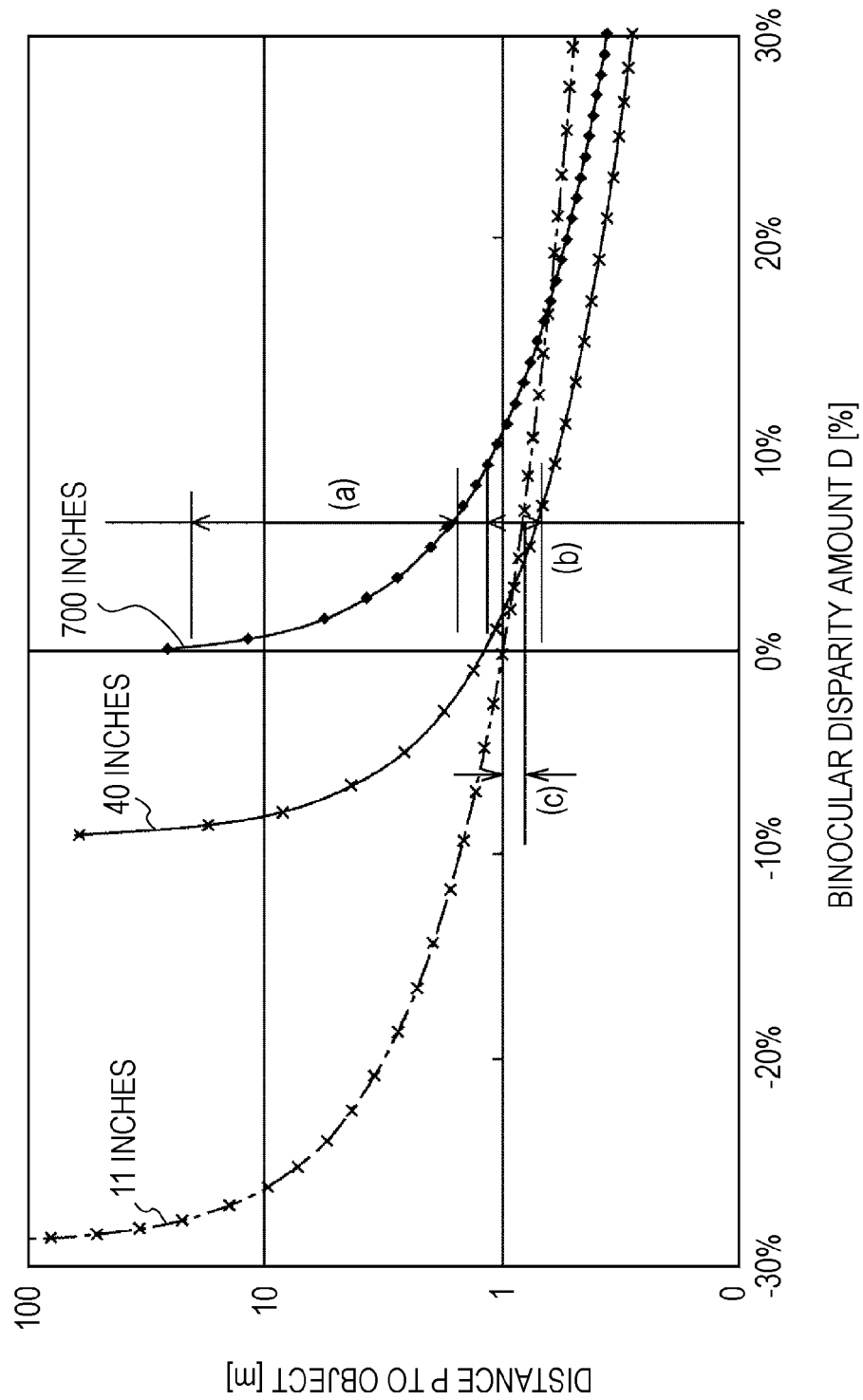
FIG. 21 is a graph chart showing a quantitative relational example between a disparity amount of the binocular disparity image and the pop-up amount and the pull-in amount of the target object in a related art.

Next, a creation method for the characteristic curves (graphs) showing the quantitative relational examples between the % binocular disparity amount D in the image display device of 11 inches and the pop-up amount and the pull-in amount of the target object described according to the first embodiment will be described. FIG. 16 is a graph chart showing a quantitative relational example between the % binocular disparity amount D for the image display device having seven types of screen sizes and the pop-up amount and the pull-in amount of the target object. The vertical axis shown in FIG. 16 is a distance L [m] to the target object I perceived by the viewer which is represented in the logarithmic scale. The horizontal axis is the % binocular disparity amount D in which the relative amount with respect to the width W of the displayable area of the image display device is regulated by way of percentile [%].

Lozenge marks on the solid line shown in FIG. 16 form a characteristic curve showing a quantitative relational example between the binocular disparity amount D in the image display device of 700 inches and the pop-up amount and the like of the target object I. Rectangular marks on the solid line form a characteristic curve showing a quantitative relational example between the binocular disparity amount D in the image display device of 100 inches and the pop-up amount and the like of the target object I. Triangular marks on the solid line form a characteristic curve showing a quantitative relational example between the binocular disparity amount D in the image display device of 70 inches and the pop-up amount and the like of the target object I.

Cross marks on the solid line form a characteristic curve showing a quantitative relational example between the binocular disparity amount D in the image display device of 40 inches and the pop-up amount and the like of the target object I. Cross marks on the broken line form a characteristic curve showing a quantitative relational example between the % binocular disparity amount D in the image display device of 32 inches and the pop-up amount and the like of the target object I. Circle marks on the solid line form a characteristic curve showing a quantitative relational example between the % binocular disparity amount D in the image display device of 20 inches and the pop-up amount and the like of the target object I. Cross marks on the dashed-dotted line form a characteristic curve showing a quantitative relational example between the % binocular disparity amount D in the image display device of 11 inches and the pop-up amount and the like of the target object I.

FIGS. 17 to 20 are tables in which numerical examples (parts 1 to 4) in which relations between the seven different screen sizes of the image display device shown in FIG. 16 and the distance P to the target object perceived by the viewer III are summarized. According to the table shown in FIG. 17, the seven types of the screen sizes of the image display device (Size [inch]) are exemplified in the calculation items, and in the respective screen sizes of the image display device, when the width is set as W [m] and the height is set as H [m], in the case of 700 inches, the width is W=15.5 [m], and the height is H=8.72 [m].

In the case of 100 inches, the width is W=2.21 [m], and the height is H=1.25 [m]. In the case of 70 inches, the width is W=1.55 [m], and the height is H=0.87 [m]. In the case of 40 inches, the width is W=0.89 [m], and the height is H=0.50 [m].

In the case of 32 inches, the width is W=0.71 [m], and the height is H=0.40 [m]. In the case of 20 inches, the width is W=0.44 [m], and the height is H=0.25 [m]. In the case of 11 inches, the width is W=0.24 [m], and the height is H=0.14 [m].

As to the above-mentioned image display devices of the total seven types, in the relation between the binocular disparity amount D shown in FIG. 2 and the pop-up amount and the pull-in amount of the target object I described with reference to FIGS. 2 and 3, while the standard visual distance from the surface II of the image display device to the eyes IVa and IVb of the viewer III is set as L, the distance between the eyes the viewer III (pupillary distance) is set as d, the disparity amount of the binocular disparity image is set as D, and the distance to the target object I to be perceived by the viewer III is set as P, the distance P is calculated on the basis of the relational expressions (1) and (2). The pupillary distance d is 65 mm, and the standard visual distance L establishes L=3H in the case of HD (high definition). In the case of SD (standard definition), L=1 [m] is established.

As to the distance P, in the case of ±30% regarding the % binocular disparity amount D, 121 types are calculated for each of the image display devices with the increment of 0.5% including 0.0%. It should be noted that in the tables in the drawing, minus values on the upper side and the left side of the border drawn by the broken line are ignored as not attributing to the quantitative relational examples shown in FIG. 16 between the % binocular disparity amount D for the seven types of the screen sizes of the image display device and the pop-up amount and the pull-in amount of the target object.

This is illustrated while the vertical axis in the logarithmic scale represents the distance P, the horizontal axis of ±% represents the % binocular disparity amount D, and these intersecting points are plotted to be connected by a curved line for the respective image display devices. Thus, it is possible to obtain the graphs (characteristic curves) showing the quantitative relational examples of the % binocular disparity amount D—the pop-up amount and the pull-in amount of the target object shown in FIG. 16 for the image display devices of the seven types of the screen sizes.

It should be understood by those skilled in the art that various modifications, combinations, sub-combinations and alterations may occur depending on design requirements and other factors insofar as they are within the scope of the appended claims or the equivalents thereof.

What is claimed is:

1. A three-dimensional image correction method comprising, the steps of:
    inputting into a data processor image information relating to a three-dimensional image to detect a displacement amount generated between an image for a left eye and an image for a right eye;
    adjusting the detected displacement amount on the basis of display device information to correct a dynamic range using the data processor, the display information informing as to at least one physical characteristic of the display device;
    correcting the displacement amount in corrected the dynamic range while corresponding to the display device information using the data processor; and
    when (a) a distance from the display surface of the display device to the eyes of the viewer is set as L, (b) a pupillary distance of the viewer is set as d, (c) the pixel displacement of the binocular disparity image on the display surface is set as D, and (d) the distance to the object perceived by the viewer is set as P, obtaining the pop-up amount (L−P) and the pull-in amount (P−L) from relational expressions:

$$D/(L-P)=d/P, (P<L) \quad (1), \text{ and}$$

$$D/(P-L)=d/P, (P>L) \quad (2).$$

2. The three-dimensional image correction method according to claim 1, further comprising the steps of:
    adjusting the detected disparity amount on the basis of the display device information to compute correction information for correcting at least one of dynamic ranges of a pop-up amount and a pull-in amount; and
    correcting the dynamic range on the basis of the computed correction information and combining the dynamic range after the correction with the detected disparity amount to correct the disparity amount of the binocular disparity image.

3. The three-dimensional image correction method according to claim 1, wherein the display device information includes information informing as to a displayable area of the display device.

4. The three-dimensional image correction method according to claim 1, further comprising, when the disparity amount of the binocular disparity image on the display screen of the display device is corrected, correcting at least one of the dynamic ranges of the pop-up amount and the pull-in amount of the three-dimensional image.

5. The three-dimensional image correction method according to claim 1, further comprising, when the disparity amount of the binocular disparity image on the display screen of the display device is corrected, referring to a mapping table describing at least one of the dynamic ranges of the pop-up amount and the pull-in amount in the three-dimensional image and previously approximately associated values.

6. The three-dimensional image correction method according to claim 1, wherein the image information for the three-dimensional image is composed of a first two-dimensional image signal for displaying a two-dimensional video picture on the display device and a second two-dimensional image signal for representing a depth with respect to the two-dimensional video picture.

7. A three-dimensional image correction method comprising, when a displacement amount which is a difference between a convergence angle on a display surface and a convergence angle on a three-dimensional surface to be perceived based on image information for a three-dimensional image and which is, between a pixel displacement amount of a binocular disparity image on the display surface and a standard visual distance from the display surface to eyes of a viewer, substantially approximated by (the pixel displacement amount)/(the standard visual distance) is set as a disparity amount, a width of a depth amount represented by pop-up and pull-in of the three-dimensional image is set as a dynamic range, and information related to a specification of a display device is set as display device information, the steps of:
    inputting into a data processor image information relating to a three-dimensional image to detect a displacement amount generated between an image for a left eye and an image for a right eye;
    adjusting the detected displacement amount on the basis of the display device information to correct a dynamic range using the data processor, the display information informing as to at least one physical characteristic of the display device;

correcting the displacement amount in corrected the dynamic range while corresponding to the display device information using the data processor; and when (a) a distance from the display surface of the display device to the eyes of the viewer is set as L, (b) a pupillary distance of the viewer is set as d, (c) the pixel displacement of the binocular disparity image on the display surface is set as D, and (d) the distance to the object perceived by the viewer is set as P, obtaining the pop-up amount (L−P) and the pull-in amount (P−L) from relational expressions:

$$D/(L-P)=d/P, (P<L) \quad (1), \text{ and}$$

$$D/(P-L)=d/P, (P>L) \quad (2).$$

8. The three-dimensional image correction method according to claim 7, further comprising the steps of:

adjusting the detected disparity amount on the basis of the display device information to compute correction information for correcting at least one of dynamic ranges of a pop-up amount and a pull-in amount; and correcting the dynamic range on the basis of the computed correction information and combining the dynamic range after the correction with the detected disparity amount to correct the disparity amount of the binocular disparity image.

9. The three-dimensional image correction method according to claim 7, wherein the display device information includes information informing as to a displayable area of the display device.

10. The three-dimensional image correction method according to claim 7, further comprising, when the disparity amount of the binocular disparity image on the display screen of the display device is corrected, correcting at least one of the dynamic ranges of the pop-up amount and the pull-in amount of the three-dimensional image.

11. The three-dimensional image correction method according to claim 7, further comprising, when the disparity amount of the binocular disparity image on the display screen of the display device is corrected, referring to a mapping table describing at least one of the dynamic ranges of the pop-up amount and the pull-in amount in the three-dimensional image and previously approximately associated values.

12. The three-dimensional image correction method according to claim 7, wherein the image information for the three-dimensional image is composed of a first two-dimensional image signal for displaying a two-dimensional video picture on the display device and a second two-dimensional image signal for representing a depth with respect to the two-dimensional video picture.

\* \* \* \* \*